(12) United States Patent
Barthle

(10) Patent No.: US 12,628,795 B1
(45) Date of Patent: May 19, 2026

(54) CLEANING APPARATUS FOR AN ARTICLE WITH AN ACCESSORY

(71) Applicant: Irma Cristina Barthle, Aurora, CO (US)

(72) Inventor: Irma Cristina Barthle, Aurora, CO (US)

(*) Notice: Subject to any disclaimer, the term of this patent is extended or adjusted under 35 U.S.C. 154(b) by 0 days.

(21) Appl. No.: 19/321,272

(22) Filed: Sep. 7, 2025

(51) Int. Cl.
| | |
|---|---|
| *A01K 13/00* | (2006.01) |
| *A01K 15/02* | (2006.01) |
| *A46B 13/00* | (2006.01) |
| *A46B 13/04* | (2006.01) |
| *A46B 15/00* | (2006.01) |
| *A46B 17/08* | (2006.01) |

(52) U.S. Cl.
CPC .......... *A01K 13/001* (2013.01); *A01K 13/002* (2013.01); *A01K 15/0201* (2025.08); *A46B 13/008* (2013.01); *A46B 13/04* (2013.01); *A46B 15/0036* (2013.01); *A46B 15/0038* (2013.01); *A46B 17/08* (2013.01); *A46B 2200/1093* (2013.01)

(58) Field of Classification Search
CPC .... A01K 13/001; A01K 13/004; A46B 13/04; A46B 2200/1093; A46B 11/00; A46B 2200/3073; A46B 9/02; B08B 1/00
See application file for complete search history.

(56) References Cited

U.S. PATENT DOCUMENTS

| | | | | |
|---|---|---|---|---|
| 6,065,431 | A * | 5/2000 | Davis | A01K 13/001 119/600 |
| 9,402,370 | B2 * | 8/2016 | Lindskov | A01K 5/0135 |
| 9,433,274 | B1 * | 9/2016 | Morrison | A46B 13/026 |
| 11,503,804 | B1 * | 11/2022 | MacPherson | A46B 5/0012 |
| 2014/0352629 | A1 * | 12/2014 | Surmeli | A01K 13/002 119/609 |
| 2015/0068461 | A1 * | 3/2015 | Lindskov | A01K 5/0135 119/51.01 |
| 2018/0255747 | A1 * | 9/2018 | Barthle | B08B 1/12 |
| 2020/0359599 | A1 * | 11/2020 | Yang | B29C 33/302 |
| 2023/0240263 | A1 * | 8/2023 | Romualdo | A01K 13/001 119/609 |

(Continued)

FOREIGN PATENT DOCUMENTS

| | | | | |
|---|---|---|---|---|
| CN | 110063266 | A * | 7/2019 | A01K 13/001 |
| CN | 112493163 | A * | 3/2021 | A01K 13/001 |

(Continued)

*Primary Examiner* — Kristen C Hayes

(74) *Attorney, Agent, or Firm* — Roger A. Jackson

(57) ABSTRACT

A cleaning apparatus for an article and method of use are disclosed, wherein the apparatus includes a base and a surrounding sidewall about a longitudinal axis, the sidewall extending from the base forming an interior, the sidewall terminating in an open aperture having a scarfed outlet margin forming a plane, wherein the plane forms an acute angle with the longitudinal axis. Operationally the scarfed margin facilitates the interior being filled to a selected capacity with a liquid while the longitudinal axis also forms an acute angle with a surface. Further a cleaning surface is movably engaged to the base that has a structure to impart movement to the cleaning surface to clean the article that is immersed in a liquid within the interior while the longitudinal axis is at the acute angle with the surface to operationally facilitate ease of immersion and removal of the article from the interior.

19 Claims, 16 Drawing Sheets

(56)                 References Cited

U.S. PATENT DOCUMENTS

2023/0404032 A1 *   12/2023   Geng ..................... A01K 13/00
2024/0315200 A1 *    9/2024   Ek ........................ A01K 13/001

FOREIGN PATENT DOCUMENTS

| | | | | | |
|---|---|---|---|---|---|
| CN | 112616708 | A | * | 4/2021 | ........... A01K 13/001 |
| CN | 112616708 | B | * | 7/2022 | ........... A01K 13/001 |
| EP | 2130430 | A1 | * | 12/2009 | ........... A01K 13/001 |
| GB | 2589707 | A | * | 6/2021 | ........... A01K 5/0114 |
| JP | 2008086294 | A | * | 4/2008 | |
| JP | 4725983 | B1 | * | 7/2011 | |
| KR | 20190054247 | A | * | 5/2019 | ............... A61L 2/26 |
| KR | 102042969 | B1 | * | 11/2019 | ............... B08B 3/02 |
| KR | 20210154911 | A | * | 12/2021 | ........... A01K 13/001 |
| KR | 102553646 | B1 | * | 7/2023 | ............... B08B 3/04 |
| KR | 2024111656 | A | * | 7/2024 | |
| KR | 102848959 | B1 | * | 8/2025 | ........... A01K 13/002 |
| WO | WO-2016028849 | A2 | * | 2/2016 | ........... A01K 13/001 |

* cited by examiner

CLEANING APPARATUS FOR AN ARTICLE WITH AN ACCESSORY

CROSS-REFERENCE TO RELATED APPLICATIONS

There are no related applications.

BACKGROUND OF INVENTION

The present invention generally relates to a cleaning apparatus for an article and more particularly a cleaning apparatus for an animal foot that can be portable, compact, and easy to use to accommodate the animal foot being inclined in position to a floor surface to make inserting and removing the animal foot easier from the cleaning apparatus. Further a planar member is included to support an accessory in the form of a pliable substance (like a pet treat), to be applied to the planar member in order to try to distract the animal during the animal's potential trepidation during the animal foot cleaning process.

Animals (whether they are companion, pets, agriculture, or farm) can get dirty feet (paws and hoofs, and the like) from being outdoors (especially in inclement weather), litter boxes, and so on, wherein many animal owners want to prevent dirt from being tracked into their living area floor from the animal. Further, individuals who exhibit or show animals want to keep their animals feet clean. Current methods of cleaning an animal's feet are to use a cleaning towelette, an absorbent cleaning pad, or sprays and wipes. None of these methods really clean typically the crevasses between an animal's paw pads, outside of using a pan full of soapy water and a soft scrub brush of which can by trying for the animal to put up with this paw manipulating to clean it as many animal's their paw pads can be quite sensitive.

Looking in particular at the prior art in this area starting with U.S. Pat. No. 4,532,668 to Slonicki is for a foot scrubber with a soap dispenser that includes scrub brushes attached to the inside of an encompassing housing, wherein the brushes are static and the user manually moves their foot within the housing as against the scrub brushes with soap dispensed when pressure is applied to a manual squeeze apparatus.

Continuing in the prior art for foot scrubbing apparatus, looking at U.S. Pat. No. 4,617,917 to Miller disclosed is a foot hygiene device that includes a shoe slipper type shaped housing with also statically attached different length bristles disposed on the inside of the housing, wherein like Slonicki, the user manually moves their foot around inside of the housing for both cleaning and massage.

Further, in the prior art for foot scrubbing apparatus, looking at U.S. Pat. No. 6,662,398 to Thomson disclosed is a hands free foot scrubber that is essentially a bathmat with a raised foot pad having bristles that is over a flexible bladder that has a soap liquid contained within the bladder, thus as the user steps on the raised foot pad the bladder releases the soap liquid to the bristles, again for the user to manually move their foot against to bristles for foot cleaning.

Next, in the prior art for foot scrubbing is U.S. Pat. No. 6,893,508 to Andrews that discloses an apparatus for foot scrubbing having a pedestal with a rough surface pad and having vertical posts for scrubbing in-between the toes, further underneath the pad is a bladder with a soapy mixture that can manually pumped by the foot that is not being washed, wherein the other foot is manually rubbed on the pad for scrubbing.

Yet further, in the prior art for foot scrubbing in U.S. Pat. No. 6,389,631 to Keith discloses a foot scrubbing device that is constructed like a foot sandal with bristles on the inside and a soap reservoir in the sole portion of the sandal shape, wherein the sole of the sandal shape is adapted to removably engage the bottom surface of a bathtub.

Continuing, in the prior art for foot scrubbing, in U.S. Pat. No. 10,327,419 to Barthle, discloses a cleaning apparatus for an article that includes a base and a surrounding sidewall that terminates in an open aperture with a scarfed margin, the base also includes a cleaning interior surface, wherein operationally the interior of the surrounding sidewall and base is filled with a liquid with the surrounding sidewall and base being manually tilted to approximately have the scarfed margin be parallel to the ground surface to facilitate easier insertion of the article (pet leg and paw) into the interior for cleaning the paw upon the cleaning interior surface.

What is needed is an animal specific paw cleaning apparatus that has the benefits of soaking the paw in soapy water while simultaneously soft brushing the paw, which being adapted to facilitate one-handed operation by the user to allow the user's other free hand to control the animal and further to allow the cleaning apparatus to tilt at about forty-five degrees angle in positional relation to the floor surface to allow the animal's leg to insert into the cleaning apparatus without the animal being required to raise their leg too much, plus this makes the removal of the animal's leg from the cleaning apparatus easier, further the planar member that can optionally pivotally rotate is included being positioned adjacent to a handle to support an accessory in the form of a pliable substance (like a pet treat), to be applied to the planar member in order to try to distract the animal during the animal's potential trepidation during the animal foot cleaning process.

SUMMARY OF THE INVENTION

Broadly, the present invention is of the cleaning apparatus for an article having a proximal end portion and an opposing distal end portion with a longwise axis spanning therebetween on the article, the cleaning apparatus itself including a base and a surrounding sidewall extending from the base, the sidewall being about a longitudinal axis, the sidewall having an interior surface and an opposing exterior surface, wherein the sidewall terminating in an open aperture having a scarfed outlet margin in relation to the base. The scarfed outlet margin structurally results in the sidewall having a maximum extension distance from the base and a peripherally opposing minimum extension distance from the base, wherein a remainder of the outlet margin has a varying extension distance from the base that is in-between the given minimum and maximum extension distances. The sidewall interior surface and the base defining a cleaning apparatus interior, wherein operationally the scarfed margin facilitates the interior being filled to a selected capacity with a liquid while the longitudinal axis forms a longitudinal axis acute angle with a surface.

Further included in the cleaning apparatus for an article is a cleaning surface that is movably engaged to the base, the cleaning surface including a plurality of flexible elements, each flexible element having a proximal end portion and an opposing distal end portion with an element length axis therebetween. Each element length axis is substantially parallel to one another, wherein the plurality of proximal end portions are affixed to one another forming a substructure and the plurality of distal end portions have free independent movement to one another in a cantilever manner. Also included in the cleaning apparatus for an article is a means for imparting movement to the substructure to cause movement at the plurality of flexible element distal end portions relative to the base and surrounding sidewall.

Also included in the cleaning apparatus for an article is a handle disposed on the sidewall exterior surface wherein the handle is positioned at the sidewall minimum extension distance, further the sidewall has a handle axis that is positioned adjacent to the scarfed outlet margin and extends through the handle.

In addition, included in the cleaning apparatus for an article is a substantially planar member including a primary end portion and an opposing secondary end portion with a planar member axis disposed therebetween, wherein the secondary end portion is affixed in an interface to the handle being adjacent to the sidewall minimum extension distance at the scarfed outlet margin, wherein the primary end portion includes a plurality of spaced apart substantially parallel fins each having a proximal end portion and an opposing distal end portion with a fin shortwise axis disposed therebetween. Further each fin has a fin longwise axis that perpendicularly positioned to the fin shortwise axis wherein the fin longwise axis is also positioned parallel to the fin distal end portion, wherein each proximal end portion is affixed to the primary end portion and positioned such that the planar member axis and the fin shortwise axis are substantially parallel to one another, further as between a pair of the spaced apart fins a channel is formed that is defined by a portion of the primary end portion and each fin proximal end portion to the distal end portion, wherein operationally the accessory is in the form of a pliable substance that is manually pushed into the channel to help retain the accessory to the planar member.

These and other objects of the present invention will become more readily appreciated and understood from a consideration of the following detailed description of the exemplary embodiments of the present invention when taken together with the accompanying drawings, in which;

DETAILED DESCRIPTION OF THE INVENTION

Figure 1:
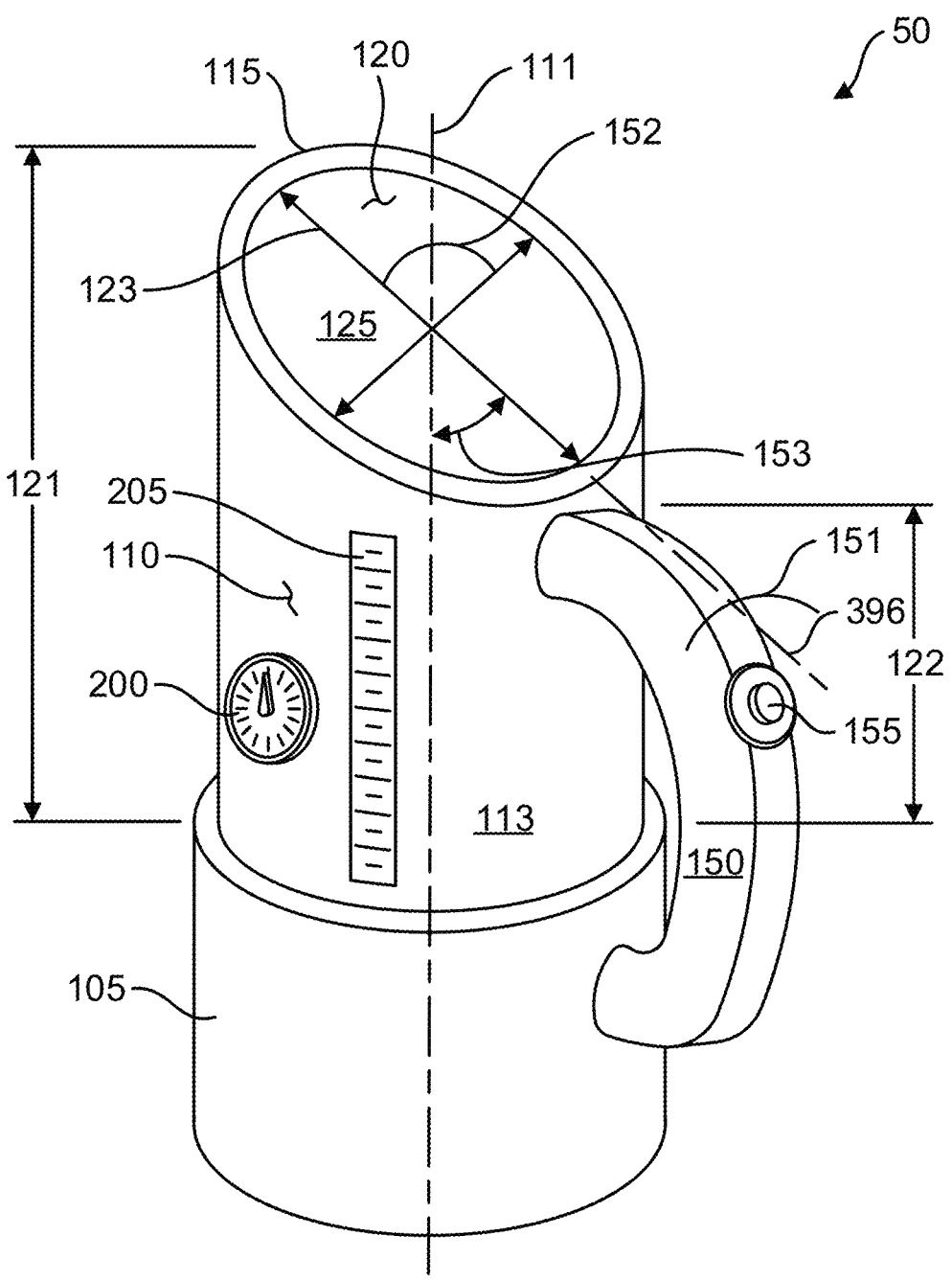
FIG. 1 shows an upper perspective view of the cleaning apparatus that includes a base, a surrounding sidewall that is about a longitudinal axis, a handle disposed upon the surrounding sidewall, in addition to an indicia index to show the level of a liquid within the surrounding sidewall, further shown is a temperature indicator disposed within the surrounding sidewall to give a temperature of the liquid, plus a scarfed outlet margin of the surrounding sidewall, wherein the scarfed outlet margin forms a plane that is at an acute angle with the longitudinal axis.

50 Cleaning apparatus for an article 175
105 Base of the cleaning apparatus 50
110 Surrounding sidewall of the cleaning apparatus 50
111 Longitudinal axis of the sidewall 110
112 Interior surface of the sidewall 110
113 Exterior surface of the sidewall 110
114 Surface
115 Scarfed outlet margin of the surrounding sidewall 110
120 Open aperture of the margin 115
121 Maximum extension distance of sidewall 110
122 Minimum extension distance of sidewall 110
123 Peripherally opposing as between the maximum extension distance 121 and the minimum extension distance 122
124 Acute angle from the longitudinal axis 111 to the surface 114
125 Interior of the base 105 and surrounding sidewall 110
126 Tilting the base 105 and sidewall 110 to make the scarfed margin 115 substantially lateral
130 Cleaning surface
131 Movable engagement of the cleaning surface 130 to the base 105
132 Plurality of flexible elements
133 Proximal end portion of the plurality of flexible elements 132
134 Distal end portion of the plurality of flexible elements 132
135 Movement of the cleaning surface 130
136 Element length axis of each one of the plurality of flexible elements 132
137 Parallel position of the element length axes 136 to one another

138 Affixment of the proximal end 133 each of the plurality of flexible elements 132 to the cleaning surface 130

139 Free cantilever movement of the distal end portion 134 of each one of the plurality of flexible element 132

140 Means for imparting movement 135 to the cleaning surface 130

141 Brush of the plurality of flexible elements 132

142 Free bristle ends of the distal end portion 134 of the plurality of flexible elements 132

143 Substructure of the cleaning surface 130

145 Motor of the means 140 for imparting movement 135 to the cleaning surface 130

146 "X" axis movement of the cleaning surface 130

147 "Y" axis movement of the cleaning surface 130

148 "Z" axis movement of the cleaning surface 130

149 Movement about the sidewall 110 longitudinal axis 111

150 Handle of the sidewall 110

151 Handle positioned at the minimum extension distance 122 of the sidewall 110

152 Scarfed plane

153 Acute angle of the scarfed plane 152 to the longitudinal axis 111 of the sidewall 110

155 On/off switch disposed on the handle 150

156 Activating of the switch 155 to activate the means 140

175 Article

176 Article potentially as part of a pet

177 Petbody

178 Pethead

179 Pet mouth

180 Proximal end portion of the article 175 potentially as a pet leg

181 Pet tongue

185 Distal end portion of the article 175 potentially as a pet paw

190 Longwise axis of the article 175

191 Placing the article 175 distal end portion 185 to be immersed in the fluid 250

192 Removing the article 175 distal end portion 185 from the fluid 250

195 Light

200 Temperature indicator of the liquid 250

205 Indicia liquid 250 level index

250 Liquid composition

251 Filling the sidewall 110 with the liquid composition 250

255 Parallel distance relationship of the scarfed outlet margin 115 plane 152 to the surface 114

300 Substantially planar member

305 Primary end portion of the planar member 300

310 Secondary end portion of the planar member 300

315 Axis of the planar member 300

320 Interface of the affixment of the secondary end portion 310 to the handle 150

325 Plurality of spaced apart fins

330 Substantially parallel relationship of the fins 325

335 Proximal end portion of the fin 325

340 Distal end portion of the fin 325

345 Shortwise axis of the fin 325

350 Longwise axis of the fin 325

355 Perpendicular position as between the longwise axis 350 and the shortwise axis 345

360 Parallel position of the fin longwise axis 350 to the fin distal end portion 340

365 Affixed nature of the proximal end portion 335 to the primary end portion 305

370 Substantially parallel relationship of the planar member axis 315 and the shortwise fin axis 345

375 Channel defined by a portion of the primary end portion 305 and a pair of fin proximal end portions 335

380 Accessory potentially in the form of a pliable pet feed

385 Manually pushing the accessory 380 into the channel 375

390 Pivotal attachment structure of the interface 320

395 Rotate movement of the substantially planar member 300 about the planar member axis 315

396 Axis of the handle 150

400 Angular orientation of the fin longwise axis 350 at a rotational angle that is disposed between the fin longwise axis 350 and the handle axis 396

405 Pivotal rotation of the plurality of fins 325 and substantially planar member 300

410 Shaft

415 Co-incident position of the shaft 410 and the planar member axis 315

420 Proximal end portion of the shaft 410

425 Distal end portion of the shaft 410

430 Thrust disc of the shaft 410

435 Perpendicular extension of the thrust disc 430 from the shaft 410

440 Retention clip 470 groove of the shaft 410 distal end portion 425

445 Rotational support element

450 First end portion of the rotational support element 445

455 Slidably receiving of the thrust disc 430 into the first end portion 450 of the rotational support element 445

460 Slidably rotationally receiving the shaft proximal end portion 420 into the first end portion 450 of the rotational support element 445

465 Second end portion of the rotational support element 445

470 Retention clip that removably engages the retention clip groove 466 to the distal end portion 425 of the shaft 410

475 Slidably receiving of the retention clip 470 by the second end portion 465

480 Affixment of the second end portion 465 to the handle 150

485 Axial retention of the substantially planar member 300 along the planar member axis 315

490 Cross section shape of an expanded rhombus shape for the distal end portion 340 of the fin 325

495 First plane of the expanded rhombus cross section shape 490

500 Parallel position of the first plane 495 to the planar member axis 315

505 Neck of the proximal end portion 335 of the fin 325 with the expanded rhombus shape 490

510 Rhombus channel defined by a portion of the primary end portion 305 and a pair of necks 505 each terminating in the expanded rhombus shape 490

515 Distracting the article 176, 179 with the accessory 380

With initial reference to FIG. 1 shown is an upper perspective view of the cleaning apparatus 50 that includes the base 105, the surrounding sidewall 110 that is about the longitudinal axis 111, with the handle 150 disposed upon the surrounding sidewall 110 exterior surface 113, in addition to the indicia index 205 to show the level of the liquid 250 within the surrounding sidewall 110, further shown is the temperature indicator 200 disposed within the surrounding sidewall 110 to give a temperature of the liquid 250, plus the scarfed outlet margin 115 of the surrounding sidewall 110, wherein the scarfed outlet margin 115 forms a plane 152 that is at an acute angle 153 with the longitudinal axis 111.

Figure 2:
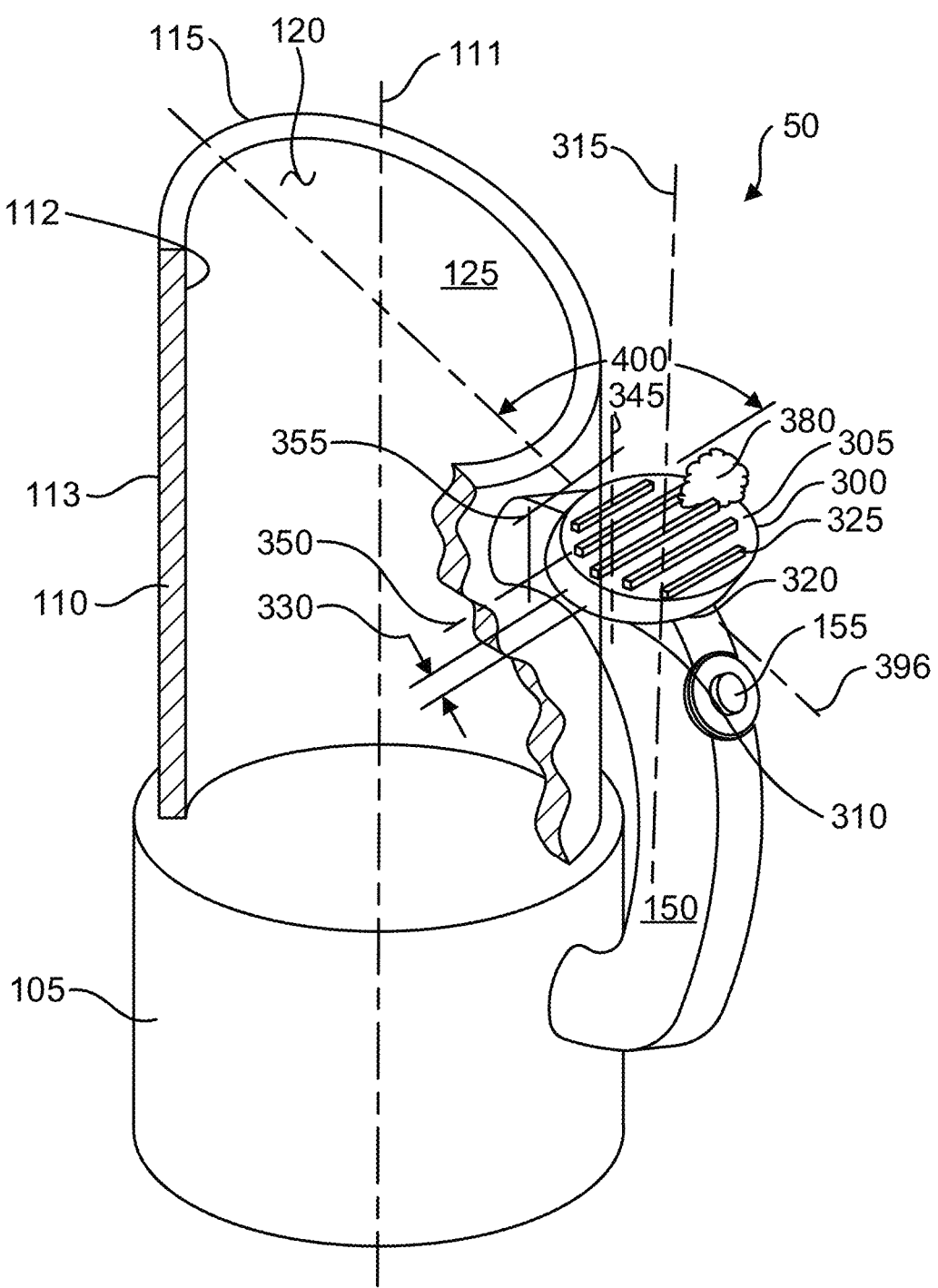
FIG. 2 shows a cutaway upper perspective view of the cleaning apparatus that includes the base, the surrounding sidewall that is about the longitudinal axis, the handle disposed upon the surrounding sidewall, wherein an interior of the surrounding sidewall is shown, further shown is an interior surface of the surrounding sidewall and an exterior surface of the surrounding sidewall, also shown is the planar member that is disposed upon the handle.

Next, FIG. 2 shows a cutaway upper perspective view of the cleaning apparatus 50 that includes the base 105, the surrounding sidewall 110 that is about the longitudinal axis 111, the handle 150 disposed upon the surrounding sidewall 110, wherein the interior 125 of the surrounding sidewall 110 is shown, further shown is an interior surface 112 of the surrounding sidewall 110, and the exterior surface 113 of the surrounding sidewall 110, further shown is the planar member 300 that is disposed upon the handle 150.

Figure 3:
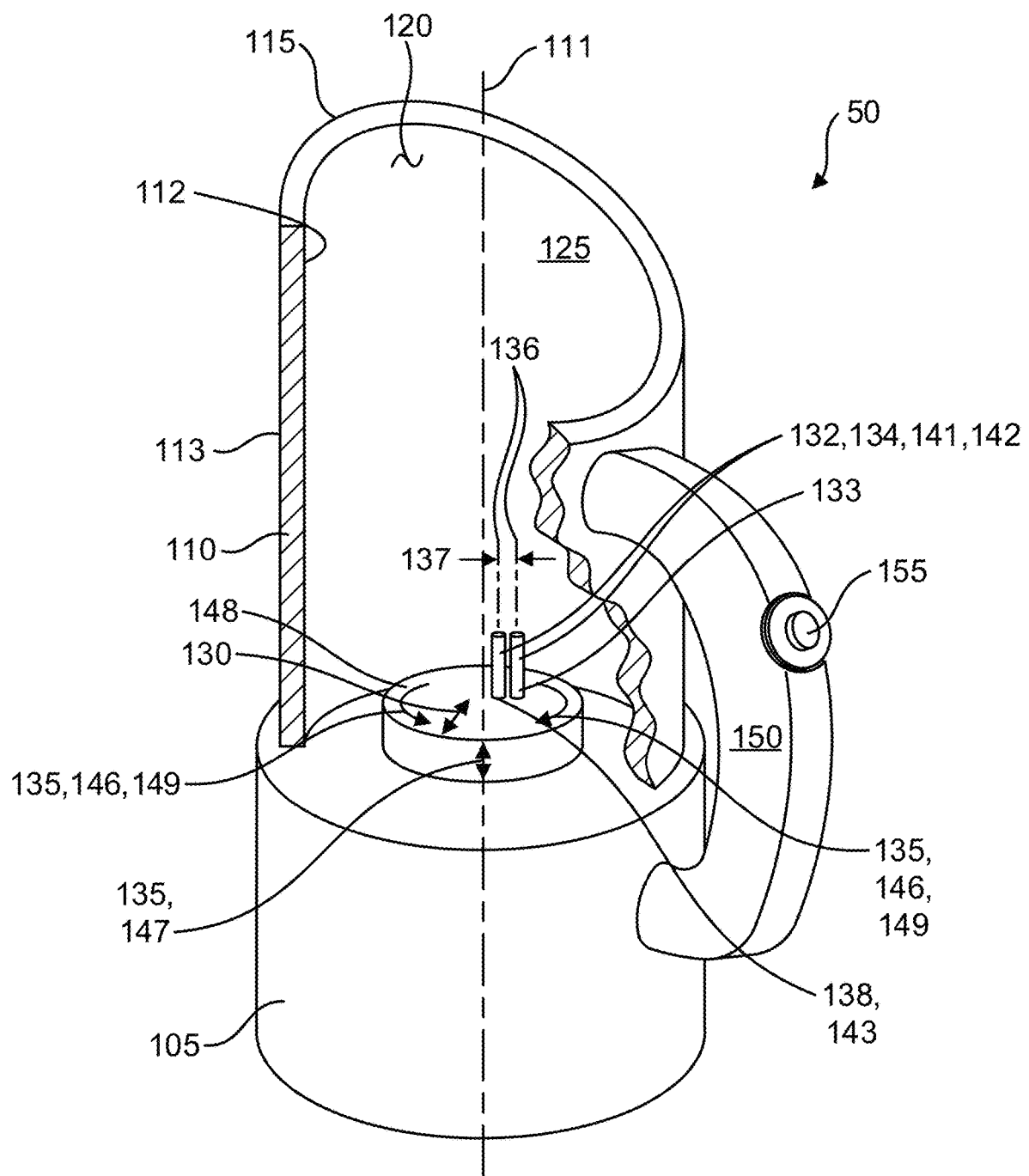
FIG. 3 shows a cutaway upper perspective view of the cleaning apparatus that includes the base, the surrounding sidewall that is about the longitudinal axis, the handle disposed upon the surrounding sidewall, wherein the interior of the surrounding sidewall is shown, further shown is the interior surface of the surrounding sidewall and the exterior surface of the surrounding sidewall, further shown is a cleaning surface that includes a plurality of flexible elements each having a proximal end portion and an opposing distal end portion, wherein each proximal end portion is affixed to the cleaning surface and each distal end portion has free cantilever movement, also the plurality of flexible elements can have movement in three axes relative to the base and surrounding sidewall.

Continuing, FIG. 3 shows a cutaway upper perspective view of the cleaning apparatus 50 that includes the base 105, the surrounding sidewall 110 that is about the longitudinal axis 111, the handle 150 disposed upon the surrounding sidewall 110, wherein the interior 125 of the surrounding sidewall 110 is shown, further shown is the interior surface 112 of the surrounding sidewall 110 and the exterior surface 113 of the surrounding sidewall 110. Further shown in FIG. 3 is a cleaning surface 130 that includes a plurality of flexible elements 132 each having a proximal end portion 133 and an opposing distal end portion 134, wherein each proximal end portion 133 is affixed 138 to the cleaning surface 130 and each distal end portion 134 has free cantilever movement 139, also the plurality of flexible elements 132 can have movement in three axes 146, 147, 148 relative to the base 105 and surrounding sidewall 110.

Figure 4:
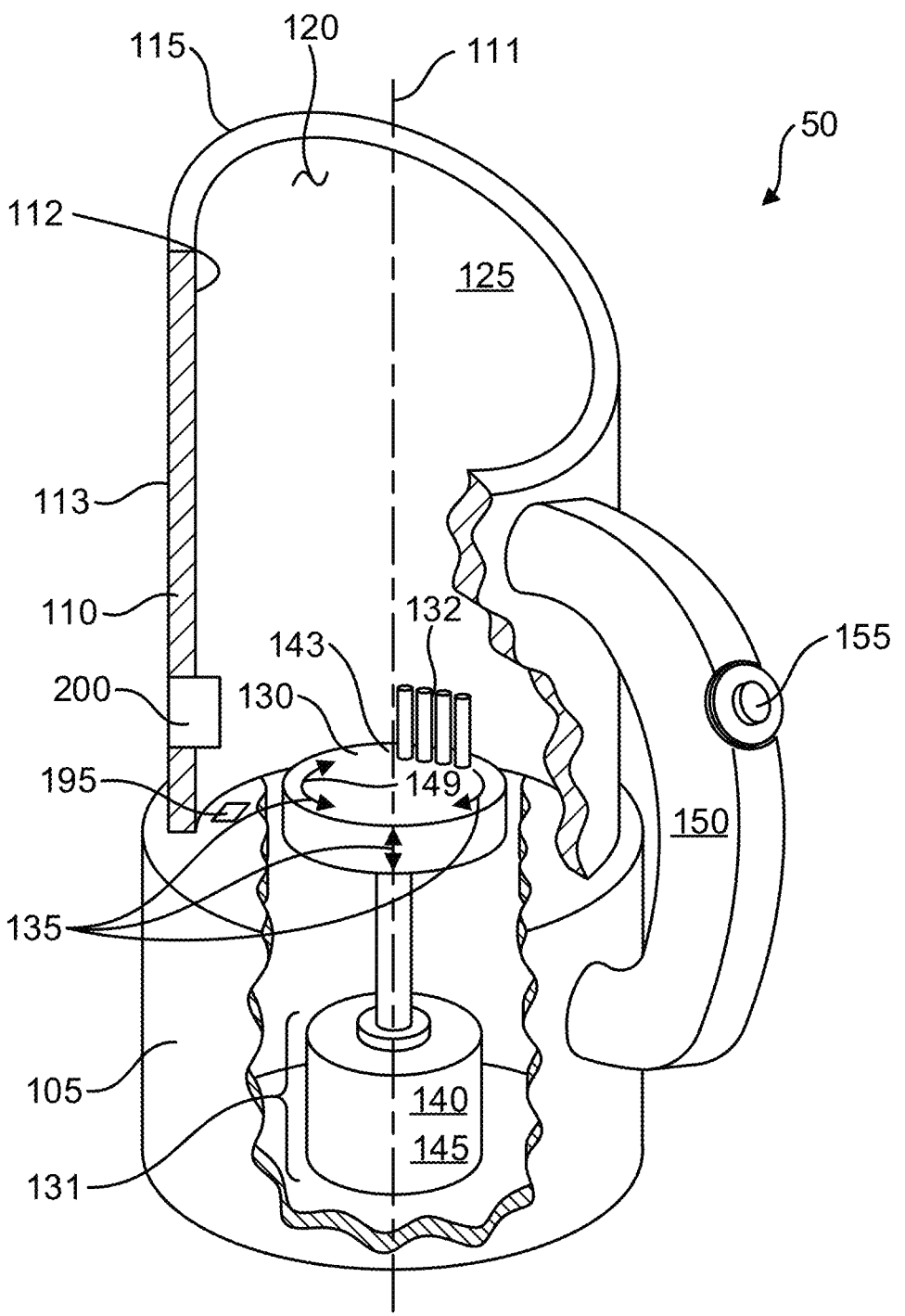
FIG. 4 shows a cutaway upper perspective view of the cleaning apparatus that includes the base, the surrounding sidewall that is about the longitudinal axis, the handle disposed upon the surrounding sidewall, wherein the interior of the surrounding sidewall is shown, further shown is the interior surface of the surrounding sidewall and the exterior surface of the surrounding sidewall, further shown is the cleaning surface that includes the plurality of flexible elements each having the proximal end portion and the opposing distal end portion, wherein each proximal end portion is affixed to the cleaning surface and each distal end portion has free cantilever movement, also the plurality of flexible elements can have movement in three axes relative to the base and surrounding sidewall all via a movable engagement of the cleaning surface to the base with a means for imparting movement to the cleaning surface shown as a motor, in addition in cross section shown therethrough the surrounding sidewall is the temperature indicator for indicating the temperature of the liquid that is disposed within the interior of the surrounding sidewall.

Yet, further FIG. 4 shows a cutaway upper perspective view of the cleaning apparatus 50 that includes the base 105, the surrounding sidewall 110 that is about the longitudinal axis 111, the handle 150 disposed upon the surrounding sidewall 110, wherein the interior 125 of the surrounding sidewall 110 is shown, further shown is the interior surface 112 of the surrounding sidewall 110 and the exterior surface 113 of the surrounding sidewall 110. Further shown in FIG. 4 is a cleaning surface 130 that includes the plurality of flexible elements 132 each having the proximal end portion 133 and the opposing distal end portion 134, wherein each proximal end portion 133 is affixed 138 to the cleaning surface 130 and each distal end portion 134 has free cantilever movement 139. Also shown in FIG. 4 is the plurality of flexible elements 132 that can have movement in three axes 146, 147, 148 relative to the base 105 and surrounding sidewall 110 all via a movable engagement 131 of the cleaning surface 130 to the base 105 with a means 140 for imparting movement 135 to the cleaning surface 130 preferably shown as a motor 145. In addition, in FIG. 4 shown in cross section therethrough the surrounding sidewall 110 is the temperature indicator 200 for indicating a temperature of the liquid 250 that is disposed within the interior 125 of the surrounding sidewall 110.

Figure 5:
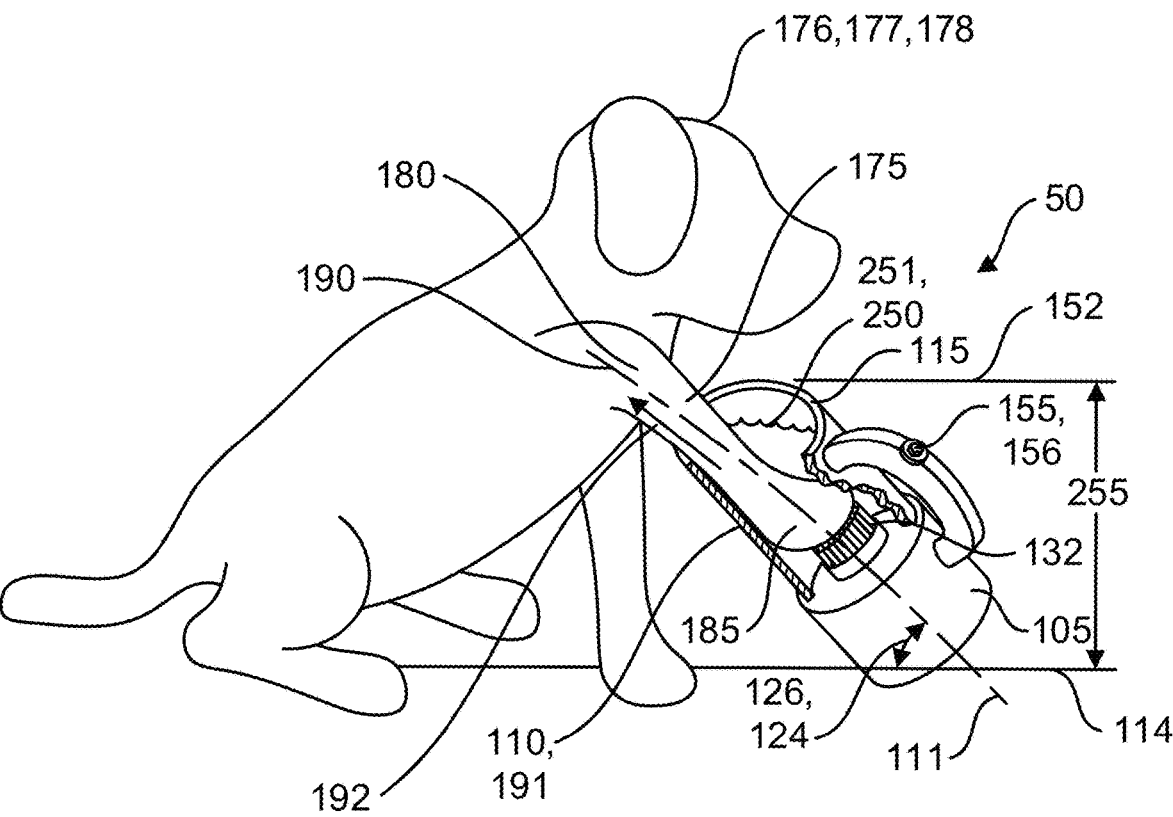
FIG. 5 shows a use perspective view showing the article in the form of a dog leg that has an article proximal end portion-being the dog leg shoulder and an article distal end portion-being the dog leg paw, wherein a portion of the dog leg and paw are inserted into the interior of the surrounding sidewall until the paw contacts the plurality of flexible elements while the portion of the dog leg and paw are immersed in the fluid composition for the operational purpose of cleaning the dog paw while holding the cleaning apparatus at an angle to the surface, such that the surrounding sidewall longitudinal axis forms an acute angle with the surface, wherein the scarfed outlet margin operationally facilitates that the scarfed outlet margin plane being substantially parallel to the surface making the dog paw and leg insertion and removal from the interior of the surrounding sidewall easier via lowering the scarfed outlet margin to be parallel and closer in distance to the surface while the article cleaning apparatus is being used, thus requiring the dog leg and paw to be lifted less distance from the surface to insert the portion of the dog leg and the paw into the surrounding sidewall interior.

Next, FIG. 5 shows a use perspective view, showing the article 175 in the form of a dog leg that has an article 175 proximal end portion 180-being the dog leg shoulder and an article 175 distal end portion 185-being the dog leg paw, wherein a portion of the dog leg and paw are inserted into the interior 125 of the surrounding sidewall 110 until the paw contacts the plurality of flexible elements 132 while the portion of the dog leg and paw are immersed in the fluid composition 250 for the operational purpose of cleaning the dog paw while holding the cleaning apparatus 50 at an angle to the surface 114. As FIG. 5 shows holding the cleaning apparatus 50 at an angle such that the surrounding sidewall 110 longitudinal axis 111 forms an acute angle 124 with the surface 114, wherein the scarfed outlet margin 115 operationally facilitates that the scarfed outlet margin 115 plane 152 being substantially parallel 255 to the surface 114 making the article 175 dog paw and leg insertion and removal from the interior 125 of the surrounding sidewall 110 easier via lowering the scarfed outlet margin 115 to be parallel 255 and closer in distance to the surface 114, while the article cleaning apparatus 50 is being used thus requiring the article 175 dog leg and paw to be lifted less distance 255 from the surface 114 to insert the portion of the article 175 dog leg and the paw into the surrounding sidewall 110 interior 125.

Figure 6:
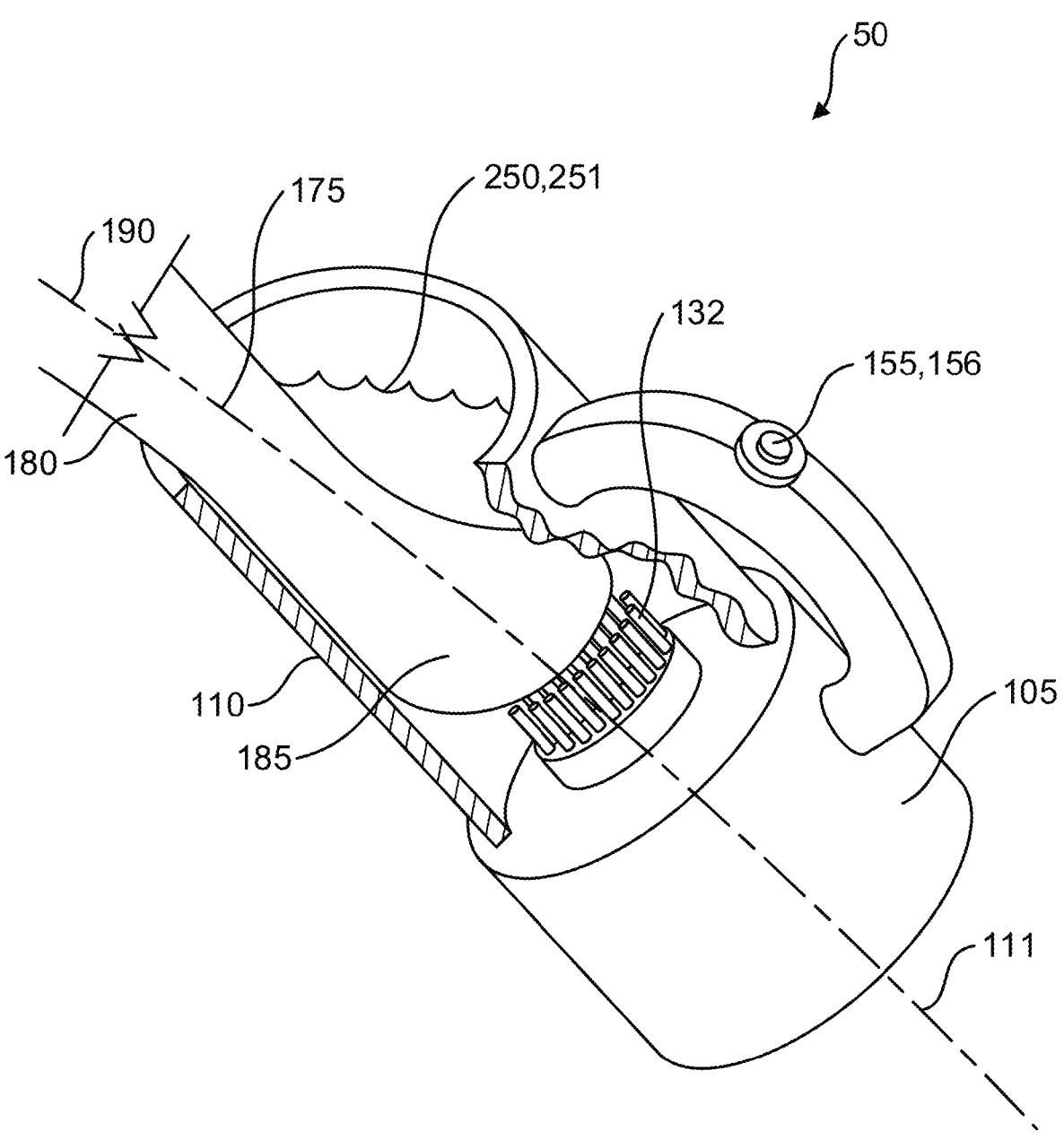
FIG. 6 shows a close up use perspective view of FIG. 5, with FIG. 6 showing the article in the form of the dog leg that has the article proximal end portion-being the dog leg shoulder and the article distal end portion-being the dog leg paw, wherein the portion of the dog leg and paw are inserted into the interior of the surrounding sidewall until the paw contacts the plurality of flexible elements while the portion of the dog leg and paw are immersed in the fluid composition for the operational purpose of cleaning the dog paw while holding the cleaning apparatus at the angle to the surface, such that the surrounding sidewall longitudinal axis forms the acute angle with the surface, wherein the scarfed outlet margin operationally facilitates that the scarfed outlet margin plane being substantially parallel to the surface making the dog paw and leg insertion and removal from the interior of the surrounding sidewall easier via lowering the scarfed outlet margin to be parallel and closer in distance to the surface while the article cleaning apparatus is being used thus requiring the dog leg and paw to be lifted less distance from the surface to insert the portion of the dog leg and the paw into the surrounding sidewall interior.

Continuing, FIG. 6 shows a close up use perspective view of FIG. 5, with FIG. 6 showing the article 175 in the form of the dog leg that has the article proximal end portion 180-being the dog leg shoulder and the article 175 distal end portion 185-being the dog leg paw, wherein the portion of the dog leg and paw are inserted into the interior 125 of the surrounding sidewall 110 until the paw contacts the plurality of flexible elements 132 while the portion of the dog leg and paw are immersed in the fluid composition 250 for the operational purpose of cleaning the dog paw while holding the cleaning apparatus 50 at an angle to the surface 114. Wherein FIG. 6 shows that the surrounding sidewall 110 longitudinal axis 111 forms an acute angle 124 with the surface 114 (shown in FIG. 5), wherein the scarfed outlet margin 115 operationally facilitates that the scarfed outlet margin 115 plane 152 being substantially parallel 255 to the surface 114 (shown in FIG. 5) making the dog paw and leg insertion and removal from the interior 125 of the surrounding sidewall 110 easier via lowering the scarfed outlet margin 115 to be parallel 255 and closer in distance to the surface 114 while the article cleaning apparatus 50 is being used thus requiring the dog leg and paw to be lifted less distance 255 from the surface 114 to insert the portion of the dog leg and the paw into the surrounding sidewall 110 interior 125.

Figure 7:
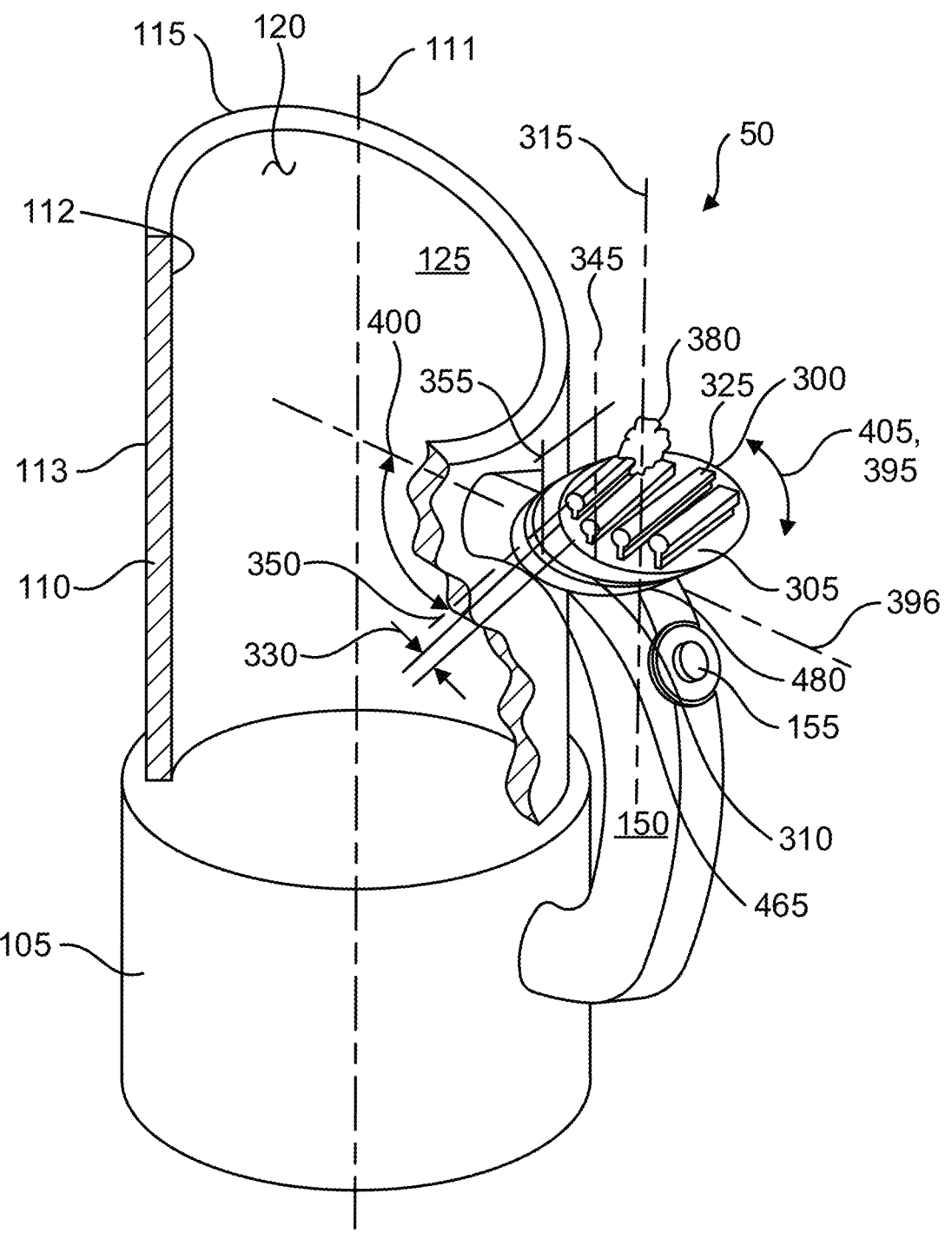
FIG. 7 shows a cutaway upper perspective view of the cleaning apparatus that includes the base, the surrounding sidewall that is about the longitudinal axis, the handle disposed upon the surrounding sidewall, wherein an interior of the surrounding sidewall is shown, further shown is an interior surface of the surrounding sidewall and an exterior surface of the surrounding sidewall, also shown is the planar member that is disposed upon the handle, wherein the planar member is pivotally attached to the handle facilitating rotation of the planar member relative to the handle.

Next, FIG. 7 shows a cutaway upper perspective view of the cleaning apparatus 50 that includes the base 105, the surrounding sidewall 110 that is about the longitudinal axis 111, the handle 150 disposed upon the surrounding sidewall 110, wherein the interior 125 of the surrounding sidewall 110 is shown, further shown is an interior surface 112 of the surrounding sidewall 110, and the exterior surface 113 of the surrounding sidewall 110, wherein the planar member 300 is pivotally attached 390 to the handle 150 facilitating rotation 395, 405 of the planar member 300 relative to the handle 150.

Figure 8:
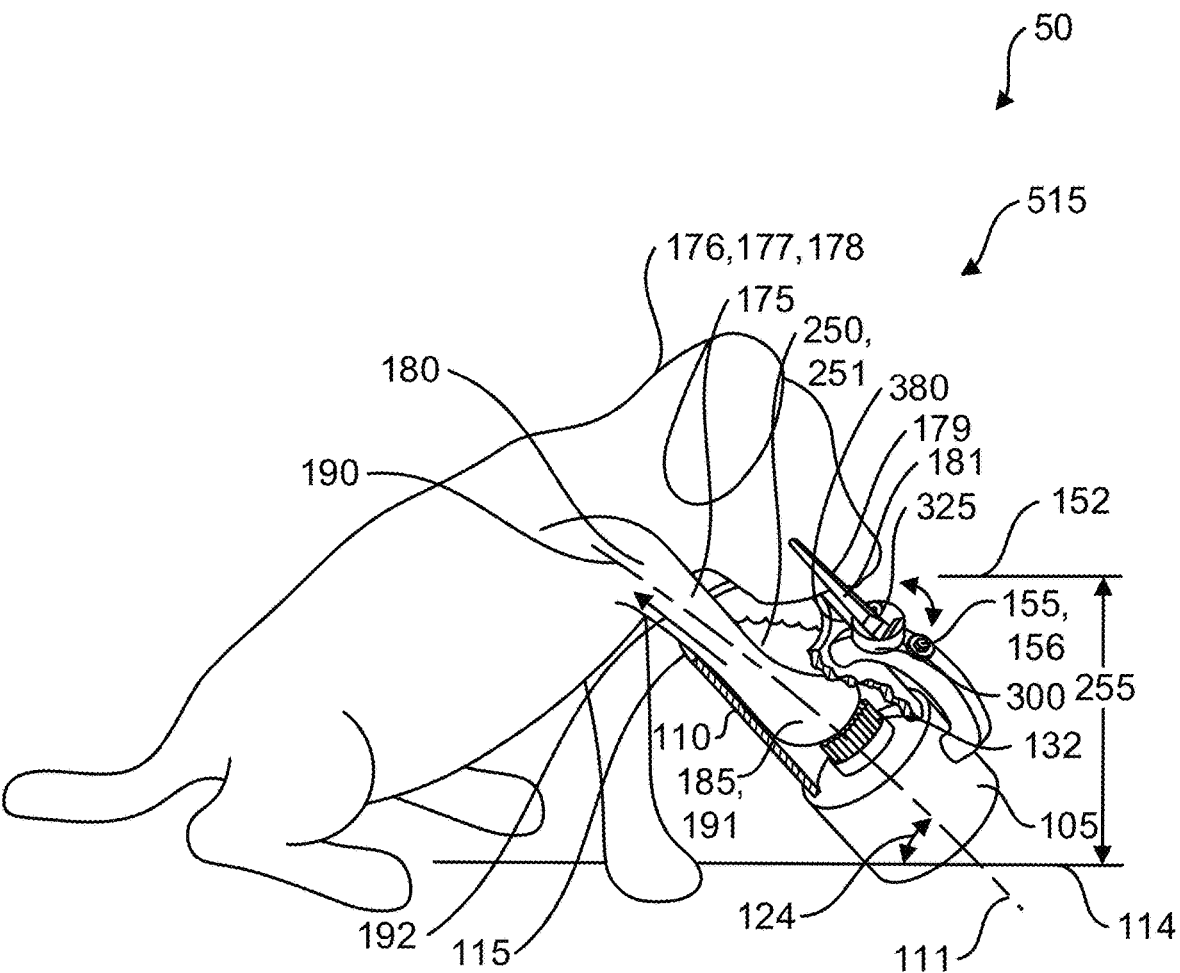
FIG. 8 shows a use perspective view showing the article in the form of a dog leg that has an article proximal end portion-being the dog leg shoulder and an article distal end portion-being the dog leg paw, wherein a portion of the dog leg and paw are inserted into the interior of the surrounding sidewall until the paw contacts the plurality of flexible elements while the portion of the dog leg and paw are immersed in the fluid composition for the operational purpose of cleaning the dog paw while holding the cleaning apparatus at an angle to the surface, such that the surrounding sidewall longitudinal axis forms an acute angle with the surface, wherein the scarfed outlet margin operationally facilitates that the scarfed outlet margin plane being substantially parallel to the surface making the dog paw and leg insertion and removal from the interior of the surrounding sidewall easier via lowering the scarfed outlet margin to be parallel and closer in distance to the surface while the article cleaning apparatus is being used, thus requiring the dog leg and paw to be lifted less distance from the surface to insert the portion of the dog leg and the paw into the surrounding sidewall interior as the planar member helps to distract the article (pet) with the accessory 380 (pet treat) during the cleaning of the pet paw.

Next, FIG. 8 shows a use perspective view, showing the article 175 in the form of a dog leg that has an article 175 proximal end portion 180-being the dog leg shoulder and an article 175 distal end portion 185-being the dog leg paw, wherein a portion of the dog leg and paw are inserted into the interior 125 of the surrounding sidewall 110 until the paw contacts the plurality of flexible elements 132 while the portion of the dog leg and paw are immersed in the fluid composition 250 for the operational purpose of cleaning the dog paw while holding the cleaning apparatus 50 at an angle to the surface 114. As FIG. 5 shows holding the cleaning apparatus 50 at an angle such that the surrounding sidewall 110 longitudinal axis 111 forms an acute angle 124 with the surface 114, wherein the scarfed outlet margin 115 operationally facilitates that the scarfed outlet margin 115 plane 152 being substantially parallel 255 to the surface 114 making the article 175 dog paw and leg insertion and removal from the interior 125 of the surrounding sidewall 110 easier via lowering the scarfed outlet margin 115 to be parallel 255 and closer in distance to the surface 114, while the article cleaning apparatus 50 is being used thus requiring the article 175 dog leg and paw to be lifted less distance 255 from the surface 114 to insert the portion of the article 175 dog leg and the paw into the surrounding sidewall 110 interior 125, wherein the planar member 300 is pivotally attached 390 to the handle 150 facilitating rotation 395, 405 of the planar member 300 relative to the handle 150, as the planar member helps to distract 515 the article 176, 179 (pet) with the accessory 380 (pet treat) during the cleaning of the pet paw.

Figure 9:
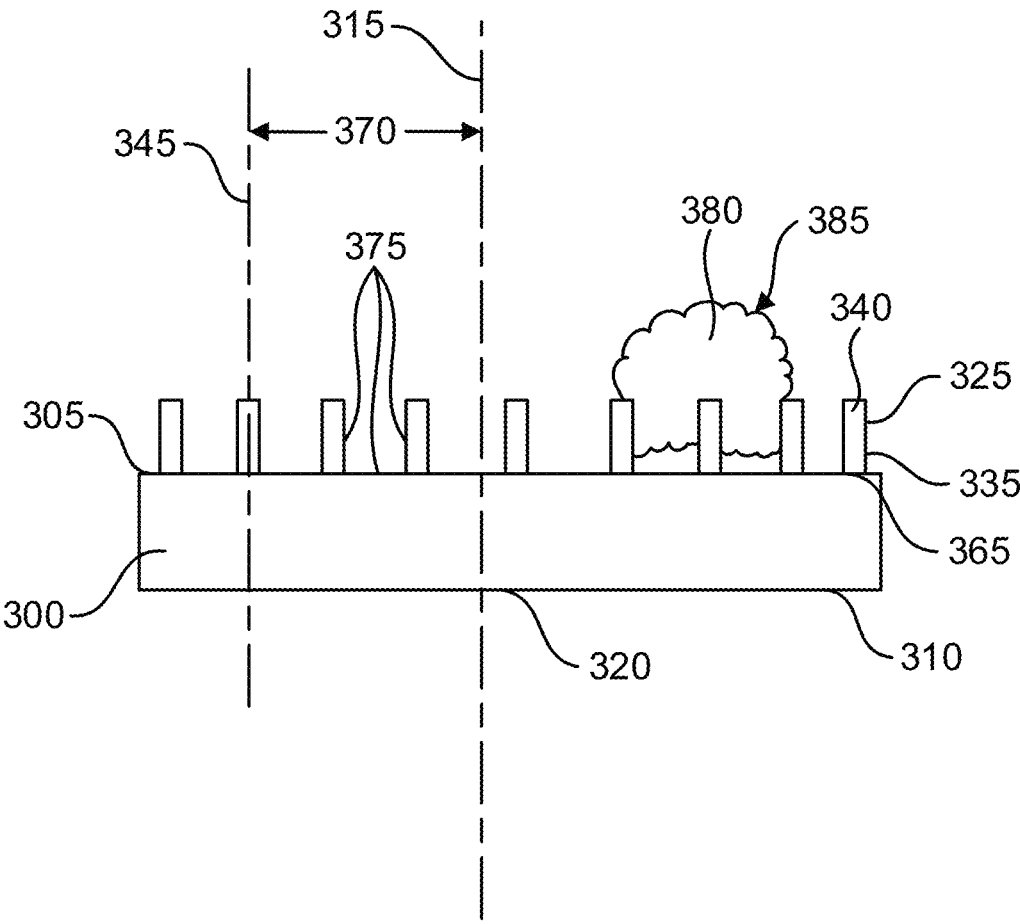
FIG. 9 shows a side elevation view of the planar member with the primary and secondary end portions with the plurality of fins disposed upon the primary end portion including the fin channels with the accessory manually pushed onto the distal end portion of the fins and into the fin channel.

Further, FIG. 9 shows a side elevation view of the planar member 300 with the primary 305 and secondary 310 end portions with the plurality of fins 325 disposed upon the primary end portion 305 including the fin channels 375 with the accessory 380 manually pushed 385 onto the distal end portion 340 of the fins 325 and into the fin channel 375.

Figure 10:
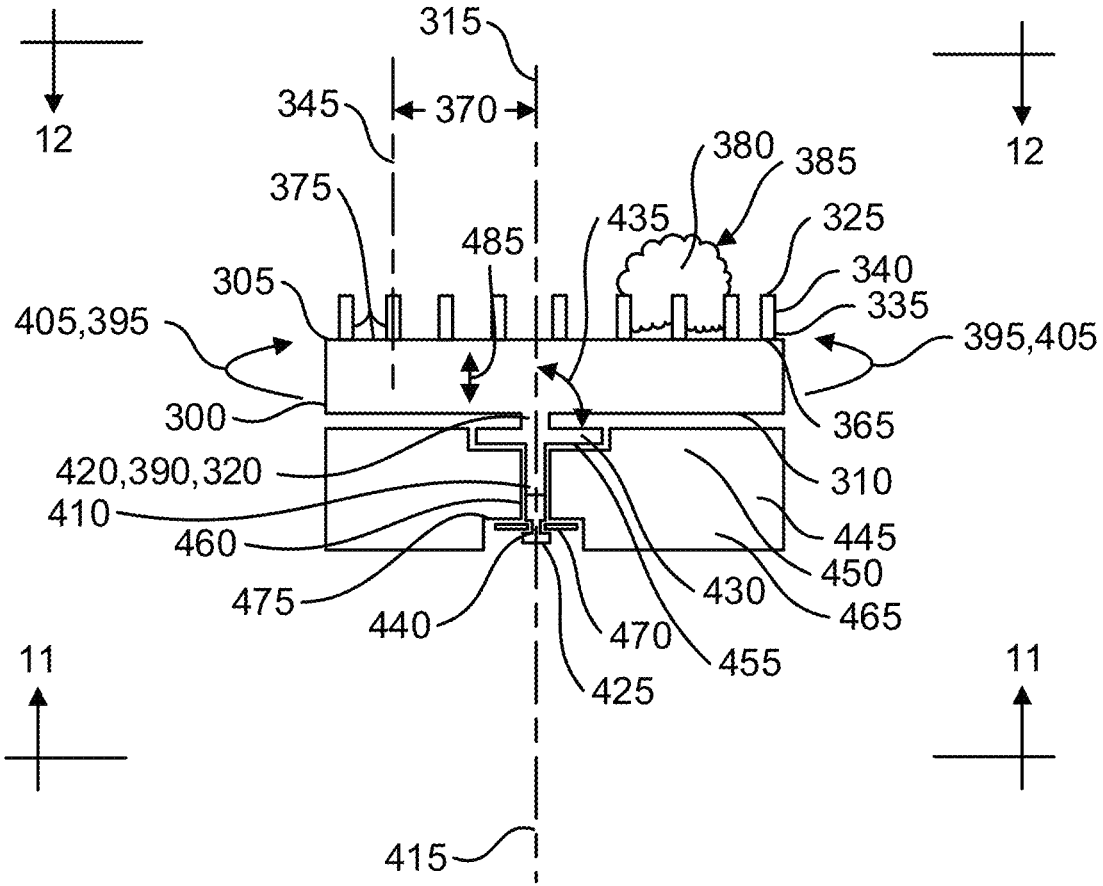
FIG. 10 shows a side elevation view of the planar member with the primary and secondary end portions with the plurality of fins disposed upon the primary end portion including the fin channels with the accessory manually pushed onto the distal end portion of the fins and into the fin channel, also shown is the interface as a pivotal attachment including the shaft, the thrust disc, and the retention clip that are all disposed within the rotational support element to enable rotation of the planar element relative to the rotational support element.

Continuing, FIG. 10 shows a side elevation view of the planar member 300 with the primary 305 and secondary 310 end portions with the plurality of fins 325 disposed upon the primary end portion 305 including the fin channels 375 with the accessory 380 manually pushed 385 onto the distal end portion 340 of the fins 325 and into the fin channel 375, also shown is the interface 320 as a pivotal attachment 390 including the shaft 410, the thrust disc 430, and the retention clip 470 that are all disposed within the rotational support element 445 to enable rotation 395, 405 of the planar element 300 relative to the rotational support element 445.

Figure 11:
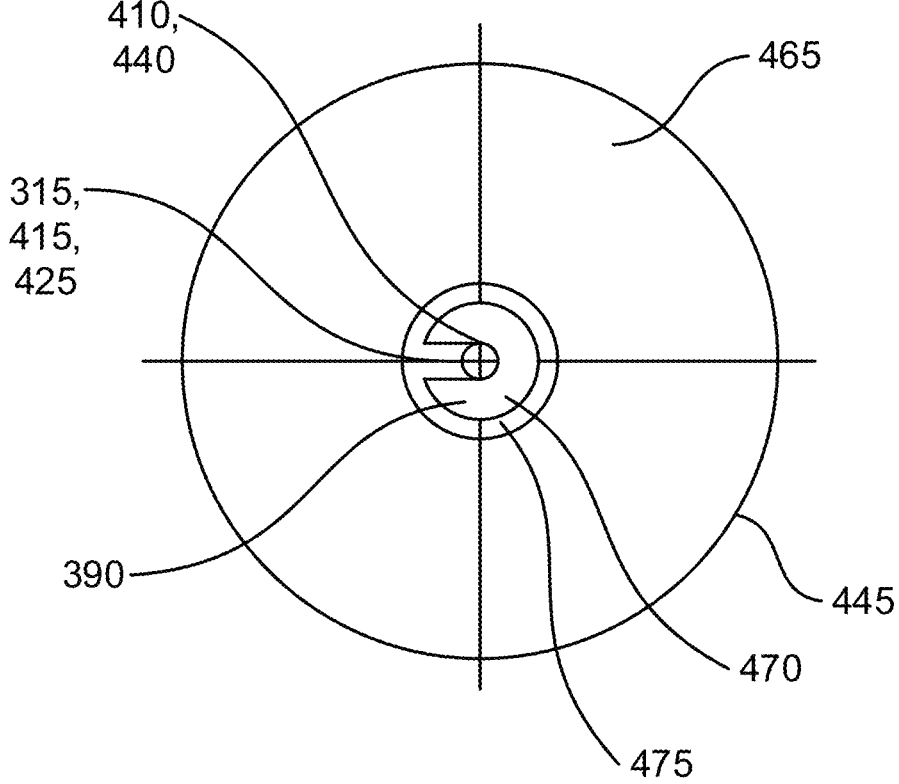
FIG. 11 shows a lower view of the rotational support element second end portion that shows the shaft, the distal end portion of the shaft, the retention clip, and the slidably receiving of the retention clip by the second end portion of the rotational support element.

Further, FIG. 11 shows a lower view of the rotational support element 445 second end portion 465 that shows the shaft 410, the distal end portion 425 of the shaft 410, the retention clip 470, and the slidably receiving 475 of the retention clip 470 by the second end portion 465 of the rotational support element 445.

Figure 12:
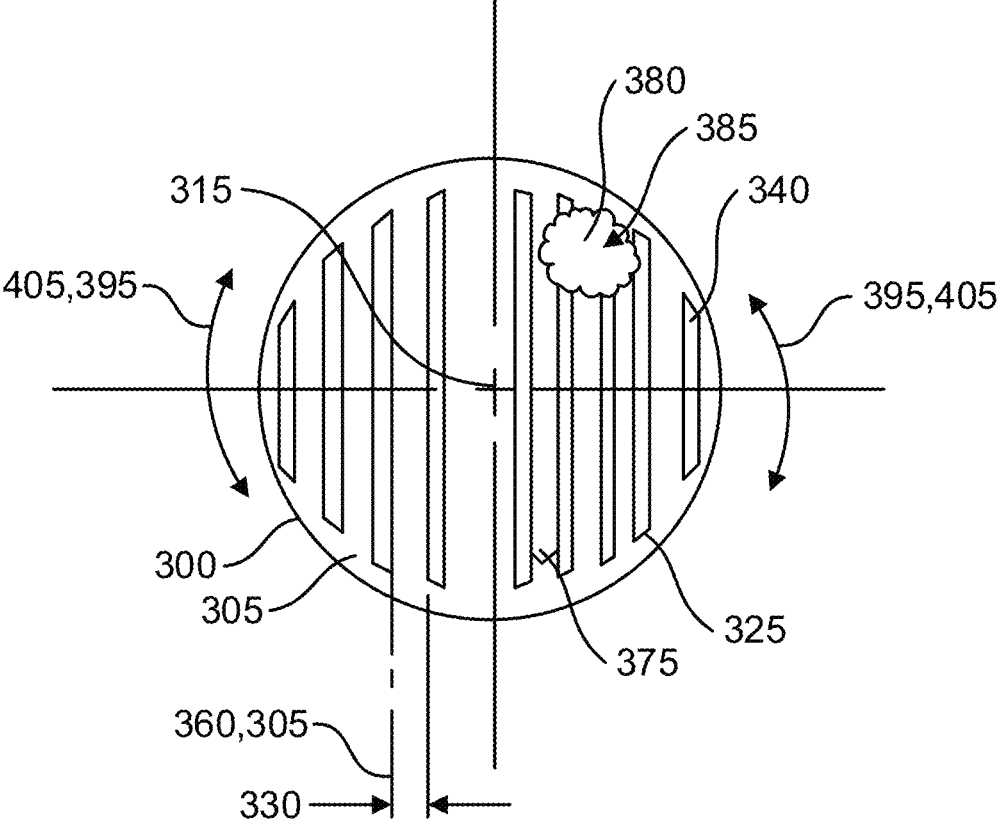
FIG. 12 shows a top plan view of the planar member with the primary end portion shown with the plurality of fins disposed upon the primary end portion including the fin channels with the accessory manually pushed onto the distal end portion of the fins and into the fin channel, further shown is the pivotal rotation of the planar member about the planar member axis facilitated by the pivotal structure of the interface.

Continuing, FIG. 12 shows a top plan view of the planar member 300 with the primary end portion shown 305 with the plurality of fins 325 disposed upon the primary end portion 305 including the fin channels 375 with the accessory 380 manually pushed onto the distal end portion 340 of the fins 325 and into the fin channel 375, further shown is the pivotal rotation 395, 405 of the planar member 300 about the planar member axis 315 facilitated by the pivotal structure 390 of the interface 320.

Figure 13:
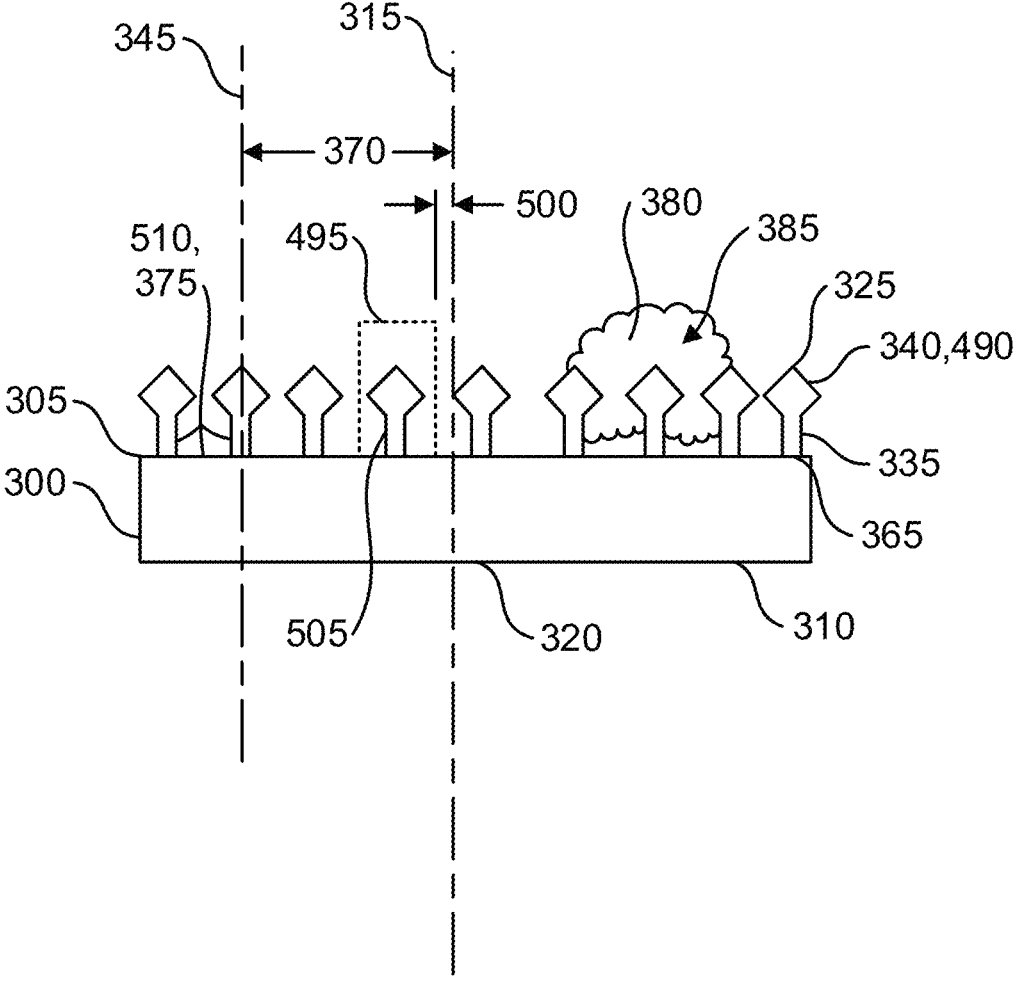
FIG. 13 shows a side elevation view of the planar member with the primary and secondary end portions with the plurality of fins disposed upon the primary end portion including the fin channels with the accessory manually pushed onto the distal end portion of the fins and into the fin channel, further shown is the alternative cross sectional shape of an expanded rhombus shape that is disposed on the distal end portion of the fin.

Next, FIG. 13 shows a side elevation view of the planar member 300 with the primary 305 and secondary 310 end portions with the plurality of fins 325 disposed upon the primary end portion 305 including the fin channels 510 with the accessory 380 manually pushed 385 onto the distal end portion 340 of the fins 325 and into the fin channel 510, further shown is the alternative cross sectional fin 325 shape of an expanded rhombus shape 490 that is disposed on the distal end portion 340 of the fin 325.

Figure 14:
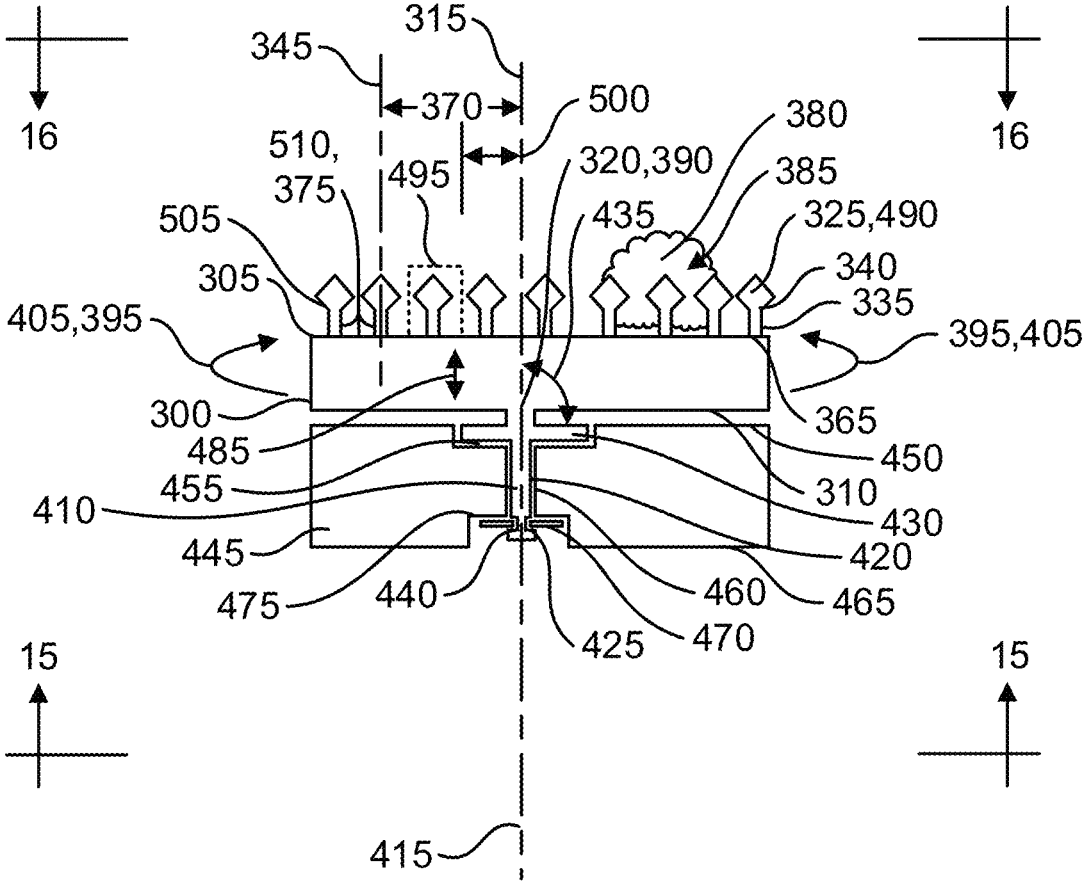
FIG. 14 shows a side elevation view of the planar member with the primary and secondary end portions with the plurality of fins disposed upon the primary end portion including the fin channels with the accessory manually pushed onto the distal end portion of the fins and into the fin channel, further shown is the alternative cross sectional shape of an expanded rhombus shape that is disposed on the distal end portion of the fin, also shown is the interface as a pivotal attachment including the shaft, the thrust disc, and the retention clip that are all disposed within the rotational support element to enable rotation of the planar element relative to the rotational support element.

Moving onward, FIG. 14 shows a side elevation view of the planar member 300 with the primary 305 and secondary 310 end portions with the plurality of fins 325 disposed upon the primary end portion 305 including the fin channels 510 with the accessory 380 manually pushed onto the distal end portion 340 of the fins 325 and into the fin channel 510, further shown is the alternative cross sectional shape of an expanded rhombus shape 490 that is disposed on the distal end portion 340 of the fin, also shown is the interface 320 as a pivotal attachment 390 including the shaft 410, the thrust disc 430, and the retention clip 470 that are all disposed within the rotational support element 445 to enable rotation 395, 405 of the planar element 300 relative to the rotational support element 445.

Figure 15:
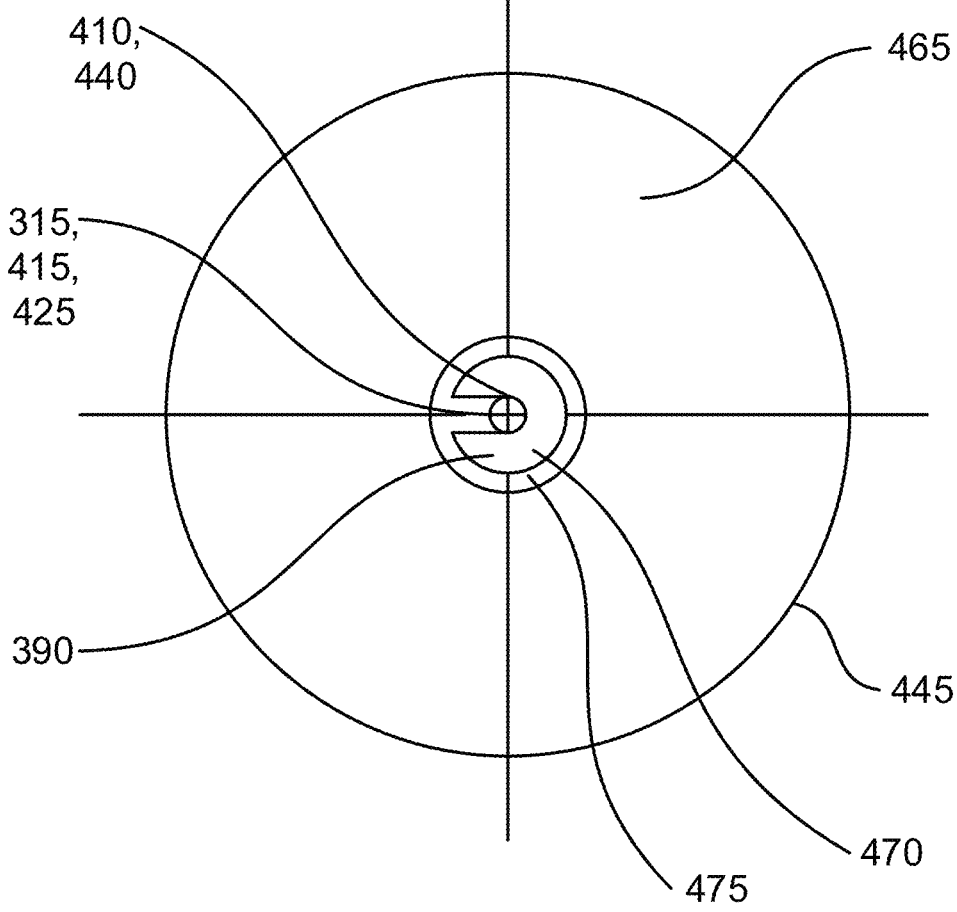
FIG. 15 shows a lower view of the rotational support element second end portion that shows the shaft, the distal end portion of the shaft, the retention clip, and the slidably receiving of the retention clip by the second end portion of the rotational support element.

Continuing, FIG. 15 shows a lower view of the rotational support element 445 second end portion 465 that shows the shaft 410, the distal end portion of the shaft 425, the retention clip 470, and the slidably receiving 475 of the retention clip 470 by the second end portion 465 of the rotational support element 445.

Figure 16:
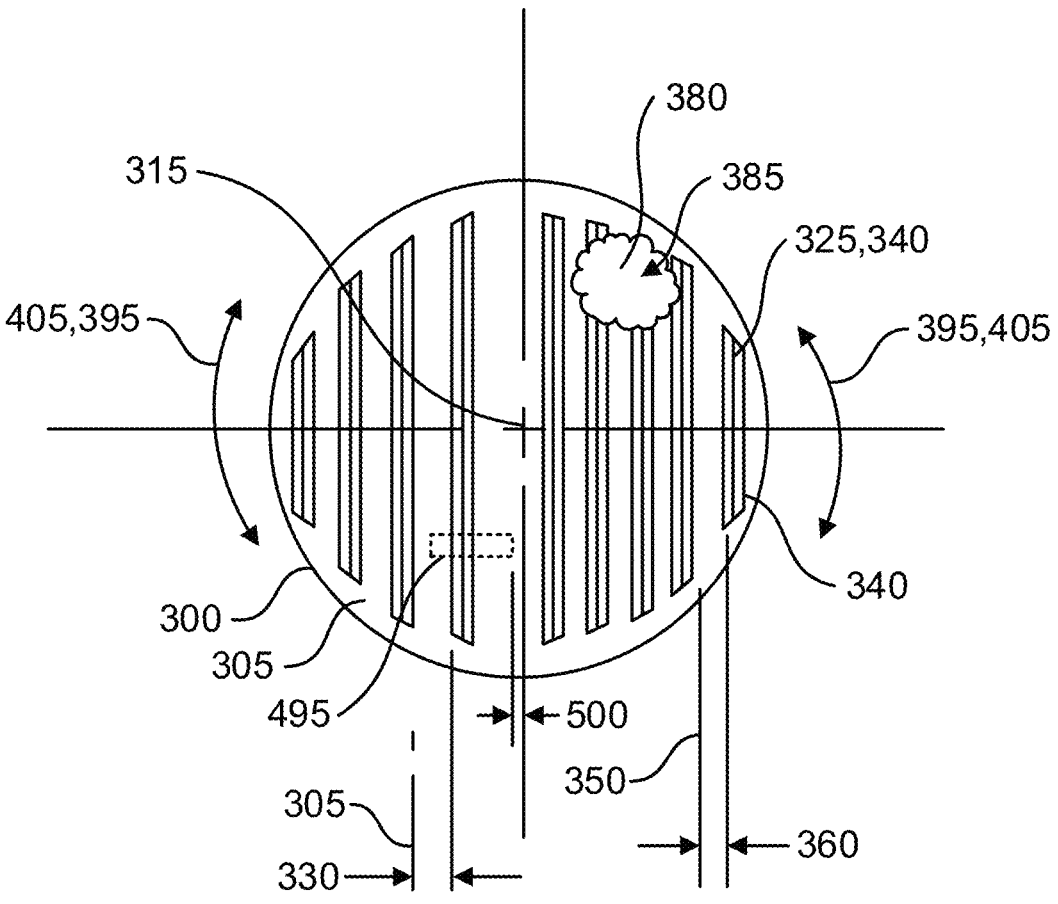
FIG. 16 shows a top plan view of the planar member with the primary end portion shown with the plurality of fins disposed upon the primary end portion including the fin channels with the accessory manually pushed onto the distal end portion of the fins and into the fin channel, further shown is the alternative cross sectional shape of an expanded rhombus shape that is disposed on the distal end portion of the fin, also shown is the pivotal rotation of the planar member about the planar member axis facilitated by the pivotal structure of the interface.

Next, FIG. 16 shows a top plan view of the planar member 300 with the primary end portion 305 shown with the plurality of fins 325 disposed upon the primary end portion 305 including the fin channels 510 with the accessory 380 manually pushed 385 onto the distal end portion 340 of the fins 325 and into the fin channel 510, further shown is the alternative cross sectional shape of an expanded rhombus shape 490 that is disposed on the distal end portion 340 of the fin 325, also shown is the pivotal rotation 395, 405 of the planar member 300 about the planar member axis 315 facilitated by the pivotal structure 390 of the interface 320.

Broadly, looking at FIGS. 1 to 16, the present invention is of the cleaning apparatus 50 is for the article 175 having the proximal end portion 180 and the opposing distal end portion 185 with the longwise axis 190 spanning therebetween on the article 175, see FIGS. 5 and 6 in particular. The cleaning apparatus 50 including the base 105 and the surrounding sidewall 110 extending from the base 105, the sidewall 110 being about the longitudinal axis 111, the sidewall 110 having the interior surface 112 and the opposing exterior surface 113, wherein the sidewall 110 terminating in an open aperture 120 having the scarfed outlet margin 115 in relation to the base 105, see FIGS. 1 to 4. The scarfed outlet margin 115 structurally results in the sidewall 110 having a maximum extension distance 121 from the base 105 and a peripherally opposing 123 minimum extension distance 122 from the base 105, wherein a remainder of the outlet margin 115 has a varying extension distance from the base 105 that is in-between the given minimum 122 and maximum 121 extension distances, see FIG. 1 in particular plus FIGS. 2 to 5. The sidewall 110 interior surface 112 and the base 105 define a cleaning apparatus interior 125, wherein operationally the scarfed margin 115 facilitates the interior 125 being filled to a selected capacity with the liquid 250 (which is preferably a lukewarm soapy solution) while the longitudinal axis 111 forms the acute angle 124 with the surface 114, see FIG. 5 and also FIG. 1.

Further included in the cleaning apparatus 50 for an article 175 is the cleaning surface 130 that is movably engaged 131 to the base 105, is the cleaning surface 130 that includes the plurality of flexible elements 132, each flexible element 132 having the proximal end portion 133 and the opposing distal end portion 134 with an element length axis 136 therebetween, as best shown in FIGS. 3 and 4. Each element length axis 136 is substantially parallel 137 in position to one another, wherein the plurality of proximal end portions 133 are affixed 138 to one another forming a substructure 143 and the plurality of distal end portions 134 have free independent movement 139 to one another in a cantilever manner, again see FIGS. 3 and 4. Also included in the cleaning apparatus 50 for an article 175 is the means 140 for imparting movement 135 to the substructure 143 to cause movement 135 at the plurality of flexible element 132 distal end portions 134, again see FIGS. 3 and 4.

Also included in the cleaning apparatus 50, is the handle 150 that is disposed on the sidewall 110 exterior surface 113 wherein the handle 150 is positioned 151 at the sidewall 110 minimum extension distance 122, as best shown in FIG. 1, plus FIGS. 2 to 5, further the sidewall 110 has a handle axis 396 that is positioned adjacent to the scarfed outlet margin 115 and extends through the handle 150.

In addition included in the cleaning apparatus 50 for the article 175 is a substantially planar member 300 including a primary end portion 305 and an opposing secondary end portion 310 with a planar member axis 315 disposed therebetween, wherein the secondary end portion 310 is affixed 320 in an interface 320 to the handle 150 being adjacent to the sidewall minimum extension distance 122 at the scarfed outlet margin 115, wherein the primary end portion 305 includes a plurality of spaced apart substantially parallel 330 fins 325 each having a proximal end portion 335 and an opposing distal end portion 340 with a fin shortwise axis 345 disposed therebetween. Further each fin 325 has a fin longwise axis 350 that perpendicularly positioned 355 to the fin shortwise axis 345 wherein the fin longwise axis 350 is also positioned parallel 360 to the fin distal end portion 340, wherein each proximal end portion 335 is affixed 365 to the primary end portion 305 and positioned such that the planar member axis 315 and the fin shortwise axis 345 are substantially parallel 370 to one another, further as between a pair of the spaced apart fins 325 a channel is formed 375 that is defined by a portion of the primary end portion 305 and each fin proximal end portion 335 to the distal end portion 340, wherein operationally the accessory is in the form of a pliable substance 380 that is manually pushed 385 into the channel 375 to help retain the accessory 380 to the planar member 300, see in particular FIGS. 2, 7, and FIGS. 8 to 16.

Optionally for the cleaning apparatus 50, wherein the cleaning surface 130 is preferably constructed of a brush 141 wherein the plurality of flexible element 132 distal end portions 134 are free bristle 142 ends 139 of the brush 141 that positionally face the scarfed outlet margin 115 and the substructure 143 is positionally facing the base 105, as best shown in FIGS. 3 and 4, plus FIGS. 5 and 6. Further, another option for the cleaning apparatus 50, wherein the means 140 for imparting movement 135 is preferably constructed of a motor 145 wherein the movement 135 is omnidirectional having movement 135 in a "X" 146, or "Y" 147, or "Z" 148 axes, as seen in FIGS. 3 and 4. Alternatively, also for the cleaning apparatus 50, wherein the means 140 for imparting movement 135 is preferably constructed of a motor 145 wherein the movement is omnidirectional having movement 135 in a "X" 146 and a "Y" 147 axes, again see FIGS. 3 and 4. Another alternative for the cleaning apparatus 50, wherein the means 140 for imparting movement 135 is preferably constructed of a motor 145 wherein the movement 135 is omnidirectional having movement 149 about the sidewall 110 longitudinal axis 111, see FIGS. 3 and 4.

Another option for the cleaning apparatus 50 is wherein the sidewall 110 is preferably constructed of transparent material such as a plastic, see all FIGS. 1 to 6.

A further option for the cleaning apparatus 50, being wherein the scarfed margin 115 forms the scarfed plane 152, wherein the scarfed plane 152 is at a plane acute angle 153 with the sidewall 110 longitudinal axis 111, as best shown in FIG. 1 and further shown in FIGS. 2 to 6. The preferred angle for the acute angle 153 is about forty-five degrees. As another option for the cleaning apparatus 50, is that it can further comprise a light 195 disposed within the sidewall 110 interior 125, as best shown in FIG. 4. Another option for the cleaning apparatus 50, is that it can further comprise the temperature indictor 200 disposed within the sidewall 110 interior to indicate the temperature of the liquid composition 250, see FIGS. 1 and 4. As another option for the cleaning apparatus 50, that can further comprise the indicia index 205 on the sidewall 110 exterior surface 113 for a fluid 250 volumetric amount in the interior 125, as best shown in FIG. 1. Again, optionally for the cleaning apparatus 50, wherein the sidewall 110 can be constructed of a self-illuminating material such as material that transmit and reflect light.

As an option for the cleaning apparatus 50, the interface 320 can be constructed of a pivotal attachment structure 390 that facilitates the substantially planar member 300 to rotate 395 about the planar member axis 315 relative to the handle 150 to operationally allow the fin longwise axis 350 to change angular orientation 400 of a rotational angle that is disposed between the fin longwise axis 350 and the handle axis 396, this is to operationally allow a pivotal rotation 405 of the plurality of fins 325 to facilitate easier removal of the accessory 380 from the fins 325 and channels 375 by the article 175, wherein the accessory 380 is in the form of a feed product and the article 175 is in the form of a pet leg and paw 176 as the feed product 380 helps to distract and comfort the pet 175 during a cleaning of the paw 176, see FIGS. 7, 8, 10, 11, 14, 15, and 16.

As another option for the cleaning apparatus 50, wherein the pivotal attachment structure 390 can be constructed of a shaft 410 coincident 415 with the planar member axis 315, with the shaft 410 extending from the secondary end portion 310, the shaft 410 having a shaft proximal end portion 420 adjacent to the secondary end portion 310 and an opposing shaft distal end portion 425, wherein the shaft proximal portion 420 includes a thrust disc 430 perpendicularly extending 435 from the planar member axis 315 and the shaft distal end portion 425 that includes a retention clip groove 440, further included is a rotational support element 445 having a first end portion 450 that slidably receives 455 the thrust disc 430, and also slidably rotationally receives 460 the shaft proximal end portion 420, the rotational support element 445 also includes a second end portion 465 that slidably receives 475 a retention clip 470 that removably engages the retention clip groove 440, the second end portion 465 is affixed 480 to the handle 150 being adjacent to the sidewall minimum extension distance 121 at the scarfed outlet margin 115, wherein operationally the thrust disc 430 and retention clip 470 rotationally retain the substantially planar member 300 axially 485 along the planar member axis 315 while allowing a pivotal rotation 395, 405 about the planar member axis 315 for the substantially planar member 300, see FIGS. 7, 8, 10, 11, 12, 14, 15, and 16.

As a continuing option for the cleaning apparatus 50, wherein each fin distal end portion 340 can be formed formed into a cross section shape of a rhombus 490 that is expanded in relation to the fin 325 in a first plane 495 that is parallel 500 to the planar member axis 315, such that a rhombus channel 510 is formed that is defined by a portion of the primary end portion 305 and each fin proximal end portion 335 in a form of a neck 505 to the expanded rhombus shape 490, wherein operationally the expanded rhombus shape 490 further helps to retain the accessory 380 disposed in the rhombus channel 510 to the planar member 300, see FIGS. 13, 14, and 16.

A further option for the cleaning apparatus 50, wherein the interface 320 can be constructed of a pivotal attachment structure 390 that facilitates the substantially planar member 300 to rotate 395 about the planar member axis 315 relative to the handle 150 to operationally allow said fin longwise axis 350 to change angular orientation 400 of a rotational angle that is disposed between the fin longwise axis 350 and the handle axis 396, this is to operationally allow a pivotal rotation 405 of the plurality of fins 325 to facilitate easier removal of the accessory 380 from the fins 325 and rhombus channels 510 by the article 175, wherein the accessory 380 is in the form of a feed product and the article 175 is in the form of a pet leg and paw 176 as the feed product 380 helps to distract and comfort the pet 175 during a cleaning of the paw 176, see FIGS. 13, 14, 15, and 16.

In addition, optionally for the cleaning apparatus 50, wherein the pivotal attachment structure 390 can be constructed of a shaft 410 coincident 415 with the planar member axis 315, with the shaft 410 extending from the secondary end portion 310, the shaft 410 having a shaft proximal end portion 420 adjacent to the secondary end portion 310 and an opposing shaft distal end portion 425, wherein the shaft proximal portion 420 includes a thrust disc 430 perpendicularly extending 435 from the planar member axis 315 and the shaft distal end portion 425 includes a retention clip groove 440, further included is a rotational support element 445 having a first end portion 450 that slidably receives 455 the thrust disc 430, and also slidably rotationally receives 460 the shaft proximal end portion 420, the rotational support element 445 also includes a second end portion 465 that slidably receives 475 a retention clip 470 that removably engages the retention clip groove 440, the second end portion 465 is affixed 480 to the handle 150 being adjacent to the sidewall minimum extension distance 121 at the scarfed outlet margin 115, wherein operationally the thrust disc 430 and retention clip 470 rotationally retain the substantially planar member 300 axially 485 along the planar member axis 315 while allowing a pivotal rotation 395, 405 about the planar member axis 315 for the substantially planar member 300, see FIGS. 13, 14, 15, and 16.

In looking particularly at FIGS. 5, 6, and 8, plus FIGS. 9, 10, 12, 13, 14, and 16, a method is disclosed for using the cleaning apparatus 50 to clean the article 175 in the form of a pet leg 176 having a proximal end portion 180 and an opposing distal end portion 185 with a longwise axis 190 spanning therebetween on the article 175, wherein the accessory 380 in the form of a pliable pet feed is provided to accompany the article 175, the method for cleaning the article 175 comprising the steps of, firstly, providing the cleaning apparatus 50 as previously described.

Next, a second step for pushing 385 the accessory 380 into the channel 375, 510 and on top of the fin distal end portion 340, see FIGS. 9, 10, 12, 13, 14, and 16.

Further, a third step of filling 251 the sidewall 110 interior 125 with a fluid 250, see FIGS. 5, 6, and 8.

Next, a fourth step of tilting 126 the base 105 and sidewall 110 such that the scarfed margin 115 is substantially lateral, see FIGS. 5, 6, and 8.

Continuing a fifth step of distracting 515 the article 176, 179 with the accessory 380, see FIG. 8.

Further, a sixth step of placing 191 the article 175 distal end portion 185 to be immersed in the fluid 250, see FIGS. 5, 6, and 8.

Moving onward, a seventh step of activating 156 the means 140 to impart movement 135 to said substructure 143, see FIGS. 5, 6, and 8.

Further, an eighth step of maintaining the means 140 to impart movement 135 for a selected period of time, see FIGS. 5, 6, and 8.

Continuing, in a ninth step of removing 192 the article 175 distal end portion 185 from the fluid 250 and the interior 125, see FIGS. 5 and 8.

Optionally for the method for cleaning the article 175, wherein the sidewall 110 can further comprise an indicia index 205 on the sidewall 110 exterior surface 113 for a fluid 250 volumetric amount in the interior 125, wherein the third step of filling 251 is further modified to fill 251 the sidewall interior 125 to a selected indicia index to operationally have a desired fluid 250 level in the interior 125 with the article 175 distal end portion 185 immersed in the fluid 250, see FIGS. 1, 5, 6, and 8.

Accordingly, the present invention of the cleaning apparatus 50 for the article 175 and method of use of the cleaning apparatus 50 has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:

1. A cleaning apparatus for an article having a proximal end portion and an opposing distal end portion with a longwise axis spanning therebetween on the article, wherein an accessory is provided to accompany the article, said cleaning apparatus comprising:

a. a base;

b. a surrounding sidewall extending from said base, said sidewall being about a longitudinal axis, said sidewall having an interior surface and an opposing exterior surface, said sidewall terminating in an open aperture having a scarfed outlet margin in relation to said base, said scarfed outlet margin structurally results in said sidewall having a maximum extension distance from said base and a peripherally opposing minimum extension distance from said base, wherein a remainder of said outlet margin has a varying extension distance from said base that is in-between said minimum and maximum extension distances, said sidewall interior surface and said base defining a cleaning apparatus interior, wherein operationally said scarfed margin facilitates said interior being filled to a selected capacity with a liquid while said longitudinal axis forms a longitudinal axis acute angle with a surface;

c. a cleaning surface movably engaged to said base, said cleaning surface including a plurality of flexible elements, each said flexible element having a proximal end portion and an opposing distal end portion with an element length axis therebetween, each said element length axis are substantially parallel to one another wherein said plurality of proximal end portions are affixed to one another forming a substructure and said plurality of distal end portions have free independent movement to one another in a cantilever manner;

d. a means for imparting movement to said substructure to cause movement at said plurality of flexible element distal end portions;

e. a handle disposed on said sidewall exterior surface wherein said handle is positioned at said sidewall minimum extension distance, further said sidewall has a handle axis that is positioned adjacent to said scarfed outlet margin and extends through said handle; and f. a substantially planar member including a primary end portion and an opposing secondary end portion with a planar member axis disposed therebetween, wherein said secondary end portion is affixed in an interface to said handle being adjacent to said sidewall minimum extension distance at said scarfed outlet margin, wherein said primary end portion includes a plurality of spaced apart substantially parallel fins each having a proximal end portion and an opposing distal end portion with a fin shortwise axis disposed therebetween, further each said fin has a fin longwise axis that perpendicularly positioned to said fin shortwise axis wherein said fin longwise axis is also positioned parallel to said fin distal end portion, wherein each said proximal end portion is affixed to said primary end portion and positioned such that said planar member axis and said fin shortwise axis are substantially parallel to one another, further as between a pair of said spaced apart fins a channel is formed that is defined by a portion of said primary end portion and each said fin proximal end portion to said distal end portion, wherein operationally the accessory is in the form of a pliable substance that is manually pushed into said channel to help retain the accessory to said planar member.

2. A cleaning apparatus according to claim 1 wherein said cleaning surface is constructed of a brush wherein said plurality of flexible element distal end portions are free bristle ends of said brush that positionally face said scarfed outlet margin and said substructure is positionally facing said base.

3. A cleaning apparatus according to claim 2 wherein said means for imparting movement is constructed of a motor wherein said movement is omnidirectional having movement in a X, or Y, or Z axes.

4. A cleaning apparatus according to claim 2 wherein said means for imparting movement is constructed of a motor wherein said movement is omnidirectional having movement in a X and a Y axes.

5. A cleaning apparatus according to claim 2 wherein said means for imparting movement is constructed of a motor wherein said movement is omnidirectional having movement about said sidewall longitudinal axis.

6. A cleaning apparatus according to claim 1 wherein said sidewall is constructed of transparent material.

7. A cleaning apparatus according to claim 6 further comprising an indicia index on said sidewall exterior surface for a fluid volumetric amount in said interior.

8. A cleaning apparatus according to claim 6 wherein said sidewall is constructed of a self-illuminating material.

9. A cleaning apparatus according to claim 1 wherein said scarfed margin forms a scarfed plane, wherein said scarfed plane is at a plane acute angle with said sidewall longitudinal axis.

10. A cleaning apparatus according to claim 9 wherein said plane acute angle is about forty-five degrees.

11. A cleaning apparatus according to claim 1 further comprising a light disposed within said sidewall interior.

12. A cleaning apparatus according to claim 1 further comprising a temperature indictor disposed within said sidewall interior.

13. A cleaning apparatus according to claim 1 wherein said interface is constructed of a pivotal attachment structure that facilitates said substantially planar member to rotate about said planar member axis relative to said handle to operationally allow said fin longwise axis to change angular orientation of a rotational angle that is disposed between said fin longwise axis and said handle axis, this is to operationally allow a pivotal rotation of said plurality of fins to facilitate easier removal of the accessory from said fins and channels by the article, wherein the accessory is in the form of a feed product and the article is in the form of a pet leg and paw as the feed product helps to distract and comfort the pet during a cleaning of the paw.

14. A cleaning apparatus according to claim 13 wherein said pivotal attachment structure is constructed of a shaft coincident with said planar member axis, with said shaft extending from said secondary end portion, said shaft having a shaft proximal end portion adjacent to said secondary end portion and an opposing shaft distal end portion, wherein said shaft proximal portion includes a thrust disc perpendicularly extending from said planar member axis and said shaft distal end portion includes a retention clip groove, further included is a rotational support element having a first end portion that slidably receives said thrust disc, and also slidably rotationally receives said shaft proximal end portion, said rotational support element also includes a second end portion that slidably receives a retention clip that removably engages said retention clip groove, said second end portion is affixed to said handle being adjacent to said sidewall minimum extension distance at said scarfed outlet margin, wherein operationally said thrust disc and retention clip rotationally retain said substantially planar member axially along said planar member axis while allowing a pivotal rotation about said planar member axis for said substantially planar member.

15. A cleaning apparatus according to claim 1 wherein each said fin distal end portion is formed into a cross section shape of a rhombus that is expanded in relation to said fin in a first plane that is parallel to said planar member axis, such that a rhombus channel is formed that is defined by a portion of said primary end portion and each said fin proximal end portion in a form of a neck to said expanded rhombus shape, wherein operationally said expanded rhombus shape further helps to retain the accessory disposed in said rhombus channel to said planar member.

16. A cleaning apparatus according to claim 15 wherein said interface is constructed of a pivotal attachment structure that facilitates said substantially planar member to rotate about said planar member axis relative to said handle to operationally allow said fin longwise axis to change angular orientation of a rotational angle that is disposed between said fin longwise axis and said handle axis, this is to operationally allow a pivotal rotation of said plurality of fins to facilitate easier removal of the accessory from said fins and rhombus channels by the article, wherein the accessory is in the form of a feed product and the article is in the form of a pet leg and paw as the feed product helps to distract and comfort the pet during a cleaning of the paw.

17. A cleaning apparatus according to claim 16 wherein said pivotal attachment structure is constructed of a shaft coincident with said planar member axis, with said shaft extending from said secondary end portion, said shaft having a shaft proximal end portion adjacent to said secondary end portion and an opposing shaft distal end portion, wherein said shaft proximal portion includes a thrust disc perpendicularly extending from said planar member axis and said shaft distal end portion includes a retention clip groove, further included is a rotational support element having a first end portion that slidably receives said thrust disc, and also slidably rotationally receives said shaft proximal end portion, said rotational support element also includes a second end portion that slidably receives a retention clip that removably engages said retention clip groove, said second end portion is affixed to said handle being adjacent to said sidewall minimum extension distance at said scarfed outlet margin, wherein operationally said thrust disc and retention clip rotationally retain said substantially planar member axially along said planar member axis while allowing rotation about said planar member axis for said substantially planar member.

18. A method for using a cleaning apparatus to clean an article in the form of a pet leg having a proximal end portion and an opposing distal end portion with a longwise axis spanning therebetween on the article, wherein an accessory in the form of a pliable pet feed is provided to accompany the article, said method for cleaning the article comprising the steps of:

a. providing a cleaning apparatus that includes a base, a surrounding sidewall extending from said base, said sidewall being about a longitudinal axis, said sidewall having an interior surface and an opposing exterior surface, said sidewall terminating in an open aperture having a scarfed outlet margin in relation to said base, said scarfed outlet margin structurally results in said sidewall having a maximum extension distance from said base and a peripherally opposing minimum extension distance from said base wherein a remainder of said outlet margin has a varying extension distance from said base that is in-between said minimum and maximum extension distances, said sidewall interior surface and said base defining a cleaning apparatus interior, wherein operationally said scarfed margin facilitates said interior being filled to capacity with a liquid while said longitudinal axis forms a longitudinal axis acute angle with a surface, further providing a cleaning surface movably engaged to said base, said cleaning surface including a plurality of flexible elements, each said flexible element having a proximal end portion and an opposing distal end portion with an element length axis therebetween, each said element length axis are substantially parallel to one another wherein said plurality of proximal end portions are affixed to one another forming a substructure and said plurality of distal end portions have free independent movement to one another in a cantilever manner, a means for imparting movement to said substructure to cause movement at said plurality of flexible element distal end portions, a handle disposed on said sidewall exterior surface wherein said handle is positioned at said sidewall minimum extension distance, further said sidewall has a handle axis that is positioned adjacent to said scarfed outlet margin and extends through said handle, and a substantially planar member including a primary end portion and an opposing secondary end portion with a planar member axis disposed therebetween, wherein said secondary end portion is affixed in an interface to said handle being adjacent to said sidewall minimum extension distance at said scarfed outlet margin, wherein said primary end portion includes a plurality of spaced apart substantially parallel fins each having a proximal end portion and an opposing distal end portion with a fin shortwise axis disposed therebetween, further each said fin has a fin longwise axis that perpendicularly positioned to said fin shortwise axis wherein said fin longwise axis is also positioned parallel to said fin distal end portion, wherein each said proximal end portion is affixed to said primary end portion and positioned such that said planar member axis and said fin axis are substantially parallel to one another, further as between a pair of said spaced apart fins a channel is formed that is defined by a portion of said primary end portion and each said fin proximal end portion to said distal end portion, wherein operationally the accessory is in the form of a pliable substance that is manually pushed into said channel to help retain the accessory to said planar member;

b. pushing the accessory into said channel and on top of said fin distal end portion;

c. filling said sidewall interior with a fluid;

d. tilting said base and sidewall such that said scarfed margin is substantially lateral;

e. distracting the article with the accessory;

f. placing the article distal end portion to be immersed in the fluid;

g. activating said means to impart movement to said substructure;

h. maintaining said means impart movement for a selected period of time; and i. removing the article distal end portion from said interior.

19. A method for cleaning an article according to claim 18 wherein said sidewall further comprises an indicia index on said sidewall exterior surface for a fluid volumetric amount in said interior, wherein said step of filling is further modified to fill said sidewall interior to a selected indicia index to operationally have a desired fluid level in said interior with the article distal end portion immersed in the fluid.

\* \* \* \* \*